(12) United States Patent
Nakano et al.

(10) Patent No.: US 6,581,135 B2
(45) Date of Patent: *Jun. 17, 2003

(54) INFORMATION STORAGE SYSTEM FOR REDISTRIBUTING INFORMATION TO INFORMATION STORAGE DEVICES WHEN A STRUCTURE OF THE INFORMATION STORAGE DEVICES IS CHANGED

(75) Inventors: Yasuhiko Nakano, Kawasaki (JP); Yoshiyuki Okada, Kawasaki (JP); Akira Karasudani, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/314,384

(22) Filed: May 19, 1999

(65) Prior Publication Data

US 2002/0035668 A1 Mar. 21, 2002

(30) Foreign Application Priority Data

May 27, 1998 (JP) .................................. 10-145784
Sep. 14, 1998 (JP) .................................. 10-260601

(51) Int. Cl.$^7$ .............................................. G06F 12/00
(52) U.S. Cl. .................... 711/114; 711/165; 711/172; 714/7
(58) Field of Search ................. 711/114, 165, 711/170–172; 714/5, 7

(56) References Cited

U.S. PATENT DOCUMENTS

| | | | | |
|---|---|---|---|---|
| 5,875,456 A | * | 2/1999 | Stallmo et al. | 711/114 |
| 5,920,702 A | * | 7/1999 | Bleidt et al. | 348/7 |
| 5,995,461 A | * | 11/1999 | Sedlmayr et al. | 369/48 |
| 6,052,759 A | * | 4/2000 | Stallmo et al. | 711/114 |
| 6,098,119 A | * | 8/2000 | Surugucchi et al. | 710/10 |
| 6,115,788 A | * | 9/2000 | Thowe | 711/114 |
| 6,138,125 A | * | 10/2000 | DeMoss | 707/202 |

OTHER PUBLICATIONS

"A Case for Redundant Arrays of Inexpensive Disks (RAID)" written by David A. Patterson, Garth Gibson and Randy H. Katz.

* cited by examiner

Primary Examiner—Reginald G. Bragdon
Assistant Examiner—Pierre M. Vital
(74) Attorney, Agent, or Firm—Greer, Burns & Crain Ltd.

(57) ABSTRACT

An information storage device stores data evenly in each of a plurality of external information-storage devices even if the number of external information-storage devices provided in the information storage system is changed. A division processing unit divides the information to be stored in the information storage devices and distributes the divided information to the information storage devices. A division control unit controls the division processing unit so as to divide the information in accordance with a number of the information storage devices. When the number of the information storage devices is changed, the division control unit controls the division processing unit so that the information stored in the information storage devices is divided by a dividing method suitable for the number of the information storage devices after being changed.

18 Claims, 47 Drawing Sheets

FIG. 9A

| NUMBER OF DIVISIONS | 3 | |
|---|---|---|
| HDD IDENTIFICATION INFORMATION | ADDRESS AT WHICH DATA IS STORED ON HDD | NUMBER OF LBAS (CONSECUTIVE) |
| HDD1 | LBA1 (Logical Block Address) | 2 |
| HDD2 | LBA2-1 | 1 |
| HDD2 | LBA2-2 | 1 |
| ... | ... | ... |
| HDD3 | LBA3 | 2 |
| ... | ... | ... |

FIG. 9B

| PARITY | IDENTIFICATION INFORMATION OF HDD STORING PARITY : HDD4 | ADDRESS AT WHICH PARITY IS STORED : LBAP | UNIT OF CALCULATION OF PARITY |
|---|---|---|---|
| | | 2 | 1024byte |

FIG. 13A

BEFORE RESTRIPPING

| NUMBER OF DIVISIONS | 1 | | | |
|---|---|---|---|---|
| TYPE OF HDD | ADDRESS | | NUMBER | |
| HDD1 | LBA-D11 | | 1 | |
| | | | | |
| PARITY | HDD2 | LBA-D11-P | 1 | 512byte |

FIG. 13B

| NUMBER OF DIVISION | 2 | | | |
|---|---|---|---|---|
| TYPE OF HDD | ADDRESS | | NUMBER | |
| HDD1 | LBA-D51 | | 1 | |
| HDD2 | LBA-D52 | | 1 | |
| | | | | |
| PARITY | HDD3 | LBA-D51-D52-P | 1 | 512byte |

FIG. 15

| NUMBER OF DIVISIONS | 3 | | | |
|---|---|---|---|---|
| IDENTIFICATION OF HDD | ADDRESS | | NUMBER | |
| HDD 1 | LBA-D11 | | 1 | |
| HDD 3 | LBA-D31 | | 1 | |
| HDD 4 | LBA-D51 | | 1 | |
| | | | | |
| PARITY | HDD 2 | LBA-D11-D31-D51-P | 1 | 512byte |

FIG. 18

| NUMBER OF DIVISIONS | 3 | | | |
|---|---|---|---|---|
| HDD IDENTIFICATION | ADDRESS | | NUMBER | |
| HDD 1 | LBA-D11 | | 2 | |
| HDD 3 | LBA-D31 | | 2 | |
| HDD 4 | LBA-D51 | | 2 | |
|  |  | |  | |
| PARITY | HDD 2 | LBA-D11-D31-D51-P | 2 | 1024byte |

FIG. 20

| NUMBER OF DIVISIONS | 2 | | | |
|---|---|---|---|---|
| HDD IDENTIFICATION | ADDRESS | | NUMBER | |
| HDD 1 | LBA-D' 1 1 | | 3 | |
| HDD 4 | LBA-D' 1 2 | | 3 | |
|  |  |  |  |  |
| PARITY | HDD 2 | LBA-D' 11-D12-P | 3 | 1536byte |

FIG. 27A

BEFORE RESTRIPPING

| NUMBER OF DIVISION | 1 | | NUMBER |
|---|---|---|---|
| HDD IDENTIFICATION | ADDRESS | | |
| HDD1 | LBA-D11 | 1 | |
| PARITY | HDD2 | LBA-D11-P | 1 | 512byte |

FIG. 27B

BEFORE RESTRIPPING

| NUMBER OF DIVISION | 1 | | NUMBER |
|---|---|---|---|
| HDD IDENTIFICATION | ADDRESS | | |
| HDD2 | LBA-D31 | 1 | |
| PARITY | HDD2 | LBA-D31-P | 1 | 512byte |

FIG. 29

| NUMBER OF DIVISIONS | 1 | | | |
|---|---|---|---|---|
| HDD IDENTIFICATION | ADDRESS | | NUMBER | |
| HDD3 | LBA-D31(New) | | 1 | |
| | | | | |
| PARITY | HDD4 | LBA-D31(N)-P | 1 | 512byte |

FIG. 33

BEFORE RESTRIPPING

| NUMBER OF DIVISIONS | 1 | | | |
|---|---|---|---|---|
| HDD IDENTIFICATION | ADDRESS | | NUMBER | |
| HDD1 | LBA-D11 | | 3 | |
|  |  |  |  | |
| PARITY | HDD2 | LBA-D11-P | 3 | 1536byte |

FIG. 36

| NUMBER OF DIVISIONS | 3 | | | |
|---|---|---|---|---|
| HDD IDENTIFICATION | ADDRESS | | NUMBER | |
| HDD 2 | LBA-D1a | | 1 | |
| HDD 3 | LBA-D1b | | 1 | |
| HDD 4 | LBA-D1c | | 1 | |
| | | | | |
| PARITY | HDD 1 | LBA-D1a-D1b-D1c-P | 3 | 1536byte |

FIG. 40

BEFORE RESTRIPPING

| NUMBER OF DIVISIONS | 3 | | | |
|---|---|---|---|---|
| HDD IDENTIFICATION | ADDRESS | | NUMBER | |
| HDD 1 | LBA-D11 | | 2 | |
| HDD 3 | LBA-D12 | | 2 | |
| HDD 4 | LBA-D13 | | 2 | |
| | | | | |
| PARITY | HDD 2 | LBA-D11-D12-D13-P | 2 | 1024byte |

FIG. 43

| NUMBER OF DIVISIONS | 2 | | |
|---|---|---|---|
| HDD IDENTIFICATION | ADDRESS | NUMBER | |
| HDD 2 | LBA-D1a | 3 | |
| HDD 3 | LBA-D1b | 3 | |
|  |  |  | |
| PARITY | HDD 1 | LBA-D1a-D1b-P | 2 | 1024byte |

INFORMATION STORAGE SYSTEM FOR REDISTRIBUTING INFORMATION TO INFORMATION STORAGE DEVICES WHEN A STRUCTURE OF THE INFORMATION STORAGE DEVICES IS CHANGED

BACKGROUND OF THE INVENTION

1. Field of the Invention

The present invention relates to an information storage system and, more particularly, to an information storage system including a plurality of information storage devices each of which stores a part of information so that the entire information is stored as a whole.

2. Description of the Related Art

In recent years, a demand for a high-speed transfer of a large amount of sound or image data has been increased in relation to the rapid growth of internet communications via personal computers. However, peripheral systems such as a network for smoothly transferring and storing a large amount of data has not been sufficiently developed. Additionally, a network communication protocol technology for transmitting such a large amount of data in real time has not been sufficiently developed. Thus, it is desirous to urgently develop a system that can transfer a large amount of data at a high-speed by using existing techniques.

A system referred to as a redundant array of inexpensive disks (RAID) has been developed for retrieving and reproducing image data from an information storage apparatus having a high-speed transfer function, such as a non-linear editing of a video on demand (VOD) or a video image processing. The RAID system was revealed in the thesis titled "A Case for Redundant Arrays of Inexpensive Disks" written by David A. Peterson, Garth Gibson and Randy H. Katz, which thesis was published in 1987 the University of California. The RAID system uses an array of a plurality of hard disk drives so as to store a set of data by dividing the data into a plurality of data blocks. The data blocks are stored concurrently in the hard disk drives. Thereby, the RAID system can achieve a high-speed data transfer.

A description will now be given of the RAID system in detail. FIG. 1 is an illustration for explaining a system structure of the RAID system.

The RAID system 1 comprises a host computer 2 and a plurality of external information-storage devices 3-1 to 3-n.

When data is stored by the RAID system, there is a method in which the same contents are written in the plurality of external information-storage devices. Additionally, there is a method in which a set of data to be stored is divided into a plurality of data blocks (referred to as stripping), and data blocks are stored in the external information-storage devices on an individual data block basis. In this method, an error correction code is produced from the plurality of data blocks and stored in the external information-storage devices so as to improve data reliability. Accordingly, if one of the data blocks is lost, correct data can be restored according to the remaining data blocks and the error correction code.

It should be noted that there are six types, RAID-0 to RAID-5, the RAID system due to differences in dividing methods of a set of data and methods for managing the error correction code.

A description will now be given of RAID-0. In RAID-0, a set of data is divided or stripped into a plurality of data blocks. The data blocks are stored in different external information-storage devices, respectively. It should be noted that since the error correction code is not produced in RAID-0, there is no fault tolerance.

In RAID-1, two external information-storage devices are provided. A set of data is stored in one of the external information-storage devices, and the same contents are stored in the other. Accordingly, if one of the external information-storage devices fails and input and output operations cannot be performed, an operation with respect to the set of data can be continued by using the other one of the external information-storage devices.

In RAID-2, a set of data is stripped on an individual bit basis, and a Hamming code is produced for the stripped data as parity. The added error correction code is dispersed and stored in a plurality of external information-storage devices.

In RAID-3, a set of data is stripped on an individual bit or byte basis. Parity is used as an error correction code. The parity is stored in an external information-storage device that is assigned to exclusively store the error correction code.

In RAID-4, a set of data is stripped on a plurality of bytes basis. Parity is used as an error correction code. The parity is stored in an external information-storage device that is assigned to exclusively store the error correction code.

In RAID-5, a set of data is stripped on a plurality of bytes basis. Parity is used as an error correction code. Parities are dispersed and stored in a plurality of external information-storage devices.

Generally, RAID-0, RAID-1 and RAID-5 are used from among the above-mentioned RAID-0 to RAID-5, in consideration of a data transfer speed and an overhead necessary for various processes.

A detailed description will now be given of RAID-5, which is frequently used. FIG. 2 is an illustration for explaining a process performed in RAID-5. FIG. 2-(A) indicates a string of input data; and FIG. 2-(B) indicates a plurality of data blocks produced by stripping the input data and storing the stripped input data in the plurality of external information-storage devices.

In RAID-5, a data block obtained by stripping a set of data on a several-byte basis and a corresponding error correction code are dispersed and stored in a plurality of external information-storage devices. For example, when the input data string A1 to A28 shown in FIG. 2-(A) is input, a plurality of single data blocks are formed by dividing the input data string by each predetermined number of sets of individual data. Accordingly, the set of input data is divided into data blocks BL1 to BL7.

The data blocks BL1 to BL7 are stored in a plurality of external information-storage devices 3-1 to 3-4. At this time, an exclusive OR operation is performed with respect to the data blocks BL1 to BL7 so as to produce parities P1 to P3. The parities P1 to P3 are dispersed and stored in the external information-storage devices 3-1 to 3-4 so that parities are not concentrated in a particular one of the external information-storage devices.

When the set of data A1 to A28 is read, the data blocks BL1 to BL7 and the parities P1 to P3 are read concurrently so that the original set of data can be restored in a short time. That is, a data transfer speed can be increased by concurrently accessing the external information-storage devices 3-1 to 3-4 so as to concurrently read a plurality of data blocks and parities.

In order to establish the RAID system, one of a hardware method and a software method can be selected. When the hardware method is selected, the calculation of parities, the stripping of the set of data and the restoration of the original set of data are performed by an exclusive circuit such as a RAID controller. According to the hardware method, a high-speed processing can be achieved but a complex operation is required for introducing new hardware and such hardware is expensive. When the software method is selected, new hardware is not required and an installation cost is low. However, the software method has a lower performance than the hardware method.

The RAID system has, on one hand, an advantage that the improvements in data transfer speed and reliability can be achieved but, on the other hand, there is a disadvantage that a storage capacity and a method of RAID cannot be easily changed once the system is put into practical use. For example, in order to increase a storage capacity, it is required to perform formatting of recording media, backup of existing data and restoration of data. This causes a stop of service or a decrease in the data transfer speed during an operation for increasing the storage capacity.

FIG. 3 is a flowchart of an operation for changing a structure of a conventional RAID system.

When a structure of the RAID system is changed, data stored in all of the external information-storage devices of the RAID system is read in step S1-1, and the read data (backup data) is stored in an information storage apparatus other than the RAID system. In step S1-2, the operation of the RAID system is stopped. Thereafter, in step S1-3, a desired change of a structure of the RAID system such as addition or deletion of external information-storage devices is performed. Then, in step S1-4, the structure of the RAID system is recognized. In step S1-5, formatting is performed in accordance with the recognized structure of the RAID system. In step S1-6, the backup data stored in step S1-1 is returned to the RAID system by performing stripping and calculations of parities in accordance with the newly set format. Then, in step S1-7, an operation of the RAID system is started, and the routine is ended.

As mentioned above, in order to change the system structure of the conventional RAID system, a stop of an operation of the system, backup of data stored in the RAID system and formatting of the RAID system must be performed, which requires time and labor.

In order to eliminate the above-mentioned problem, a method for increasing a storage capacity without stopping system operations or decreasing a data transfer speed has been suggested. In the suggested method, stripping information such as information regarding a unit of a data block, a number of data blocks or stored addresses is stored together with the data blocks so that different sets of data can be stored in the same RAID system according to different stripping methods.

Specifically, the host computer is connected to the external information-storage devices via an interface that can detect connection of an apparatus without turning off the power. When a write request is made, data to be stored is stripped and data blocks and stripping information are stored in the external information-storage devices. If additional external information-storage devices are added so as to increase a storage capacity, the data to be written is stored with the stripping information in accordance with a new structure of the RAID system. When the data stored in the RAID system is read, the stripping information is retrieved first. Then, the data blocks are read in accordance with the retrieved stripping information so as to restore the original set of data.

According to the above-mentioned method, a stripping method corresponding to a present structure of the RAID system can be used. Thus, the RAID system can be restructured without formatting or backup of data.

A description will now be given of the above-mentioned RAID system in detail.

FIG. 4 is an illustration for explaining a state of the RAID system of which a structure is changeable without stopping an operation before being changed. FIG. 4-(A) indicates an input data string before a change is made; FIG. 4-(B) indicates a state of data stored in the external information-storage devices 3-1 to 3-3 before the change is made. FIG. 5 is an illustration for explaining a state of the RAID system shown in FIG. 4 after the change is made. FIG. 5-(A) indicates an input data string after the change is made; FIG. 5-(B) indicates a state of data stored in the external information-storage devices 3-1 to 3-4 after the change is made.

In the RAID system shown in FIG. 4, the external information-storage devices 3-1 to 3-3 are provided. When the data string A1–A8, B1–B8 and C1–C8 is supplied to the RAID system as shown in FIG. 4(A), the data A1–A8 is stripped into data blocks BL1 and BL2. The data block BL1 includes data A1 to A4, and the data block BL2 includes data A5 to A8. At this time, a parity 1 is produced for performing an error correction and stripping information S1 representing a method for stripping the data A1–A8 is also produced. The data blocks BL1 and BL2, the parity 1 the stripping information S1 are dispersed and stored in the external information-storage devices 3-1 to 3-3. That is, the data block BL1 is stored in the external information-storage device 3-1 together with the stripping information S1. The data block BL2 is stored in the external information-storage device 3-2. The parity 1 is stored in the external information-storage device 3-3.

The data B1–B8 is stripped into data blocks BL3 and BL4. The data block BL3 includes data B1 to B4, and the data block BL4 includes data B5 to B8. At this time, a parity 2 is produced for performing an error correction and stripping information S2 representing a method for stripping the data B1–B8 is also produced. The data blocks BL3 and BL4, the parity 2 and the stripping information S2 are dispersed and stored in the external information-storage devices 3-1 to 3-3. That is, the data block BL3 is stored in the external information-storage device 3-1 together with the stripping information S2. The data block BL4 is stored in the external information-storage device 3-3. The parity 2 is stored in the external information-storage device 3-2.

The data C1–C8 is stripped into data blocks BL5 and BL6. The data block BL5 includes data C1 to C4, and the data block BL6 includes data C5 to C8. At this time, a parity 3 is produced for performing an error correction and stripping information S3 representing a method for stripping the data C1–C8 is also produced. The data blocks BL5 and BL6, the parity 3 and the stripping information S3 are dispersed and stored in the external information-storage devices 3-1 to 3-3. That is, the data block BL5 is stored in the external information-storage device 3-2 together with the stripping information S3. The data block BL6 is stored in the external information-storage device 3-3. The parity 3 is stored in the external information-storage device 3-1.

If the additional external information-storage device 3-4 is added to the RAID system as shown in FIG. 5, the system detects the addition of the new external information-storage device 3-4, and data subsequently input to the changed RAID system is stored in the four external information-storage devices 3-1 to 3-4.

When a set of data D1–D8, E1–E8 and F1–F8 is supplied to the RAID system as shown in FIG. 5-(A), the data D1–D8 is stripped into data blocks BL7 and BL8. The data block BL7 includes data D1 to D4, and the data block BL8 includes data D5 to D8. The data E1–E8 is stripped into data blocks BL9 and BL10. The data block BL9 includes data E1 to E4, and the data block BL10 includes data E5 to E8. The data F1–F8 is stripped into data blocks BL11 and BL12. The data block BL11 includes data F1 to F4, and the data block BL12 includes data F5 to F8. At this time, a parity 4 is produced for performing an error correction with respect to the data D1 to D8 and E1 to E4, and a parity 5 is produced for performing an error correction with respect to the data E5 to E8 and F1 to F8. Additionally, stripping information S4 representing a method for stripping the data D1–D8 and the data E1 to E4 is produced, and stripping information S5 representing a method for stripping the data E5–E8 and data F1 to F8 is produced.

The data blocks BL7, BL8 and BL9, the parity 4 and the stripping information S4 are dispersed and stored in the external information-storage devices 3-1 to 3-4. That is, the data block BL7 is stored in the external information-storage device 3-1 together with the stripping information S4. The data block BL8 is stored in the external information-storage device 3-2. The data block BL9 is stored in the external information-storage device 3-3. The parity 4 is stored in the external information-storage device 3-4.

Additionally, the data blocks BL10, BL11 and BL12, the parity 5 and the stripping information S5 are dispersed and stored in the external information-storage devices 3-1 to 3-4. That is, the data block BL10 is stored in the external information-storage device 3-1 together with the stripping information S5. The data block BL11 is stored in the external information-storage device 3-2. The data block BL12 is stored in the external information-storage device 3-4. The parity 5 is stored in the external information-storage device 3-3.

In the method described with reference to FIGS. 4 and 5, an amount of data stored in the added external information-storage device 3-4 is not equal to an amount of data stored in each of the external information-storage devices 3-1 to 3-3.

FIG. 6 is an illustration for explaining a problem that occurs when a structure of the RAID system is changed.

Suppose that the external information-storage device 3-4 is added after data blocks DB11, DB12, DB21, DB22, DB31, DB32, DB41, DB42, DB51, DB52, DB61, DB62, DB71, DB72, DB81 and DB82 are stored in the external information-storage devices 3-1 to 3-3 together with parities P1 to P8. In this state, when new data blocks DB91, DB92, DB93, DB01, DB02 and DB03 are supplied to the RAID system, the data blocks DB91 and DBO1 are stored in the external information-storage device 3-1; the data blocks DB92 and DB02 are stored in the external information-storage device 3-2, the data blocks DB93 and DB03 are stored in the external information-storage device 3-3; and a parity P9 with respect to the data blocks DB91, DB92 and DB93 and a parity P10 with respect to data blocks DB01, DB02 and DB03 are stored in the external information-storage device 3-4.

Accordingly, the newly added external information-storage device 3-4 stores the data blocks that are supplied after the device is added. On the other hand, each of the external information-storage devices 3-1 to 3-3 stores the data blocks that are supplied before and after the external information-storage device 3-4 is supplied. As a result, an amount of data stored in the external information-storage device 3-4 is less than an amount of data stored in each of the external information-storage devices 3-1 to 3-3. That is, there is a deviation in an amount of data stored in the external information-storage devices. Accordingly, an input and output operation cannot be dispersed evenly to each of the external information-storage devices. This causes deterioration in efficiency of storage devices and interfaces. Thus, a maximum data-transfer speed that is obtainable cannot be achieved.

Additionally, in the RAID system, it is possible that a number of external information-storage devices is decreased so as to decrease a management cost such as a cost for power supply (power consumption). However, the above-mentioned conventional RAID system does not have such a function to restore the data, which is stored before a change is made, in accordance with a data structure after the change of the system structure. Thus, in the conventional RAID system, the external information-storage devices cannot be removed.

Further, if an amount of data stored in one of the external information-storage devices reaches its maximum storage capacity, the RAID system cannot store any new data even if the external information-storage devices other than the one which stores the maximum data amount can still store additional data.

A description will now be given of another problem in the conventional RAID system. FIG. 7 is an illustration for explaining the problem which may occur in the conventional RAID system.

Suppose that the RAID system shown in FIG. 7 is constructed by sequentially adding the external information-storage devices 3-3, 3-4 and 3-5, in that order, to the RAID system provided with the external information-storage devices 3-1 and 3-2. When data blocks D11, D21, D31 and D41 are supplied to the RAID system in a state in which only the external informaton-storage devices 3-1 and 3-2 are provided, the data blocks D11 and D21 and parities P3 and P4 with respect to the data blocks D31 and D41 are stored in the external information-storage device 3-1 and the data blocks D11 and D21 and parities P1 and P2 with respect to the data blocks D11 and D12 are stored in the information-storage device 3-2.

Thereafter, when data blocks D51, D52, D61, D62, D71, D72, D81 and D82 are supplied to the RAID system after the external information-storage device 3-3 is added to the RAID system, the data blocks D51, D61, D71 and D81 are stored in the external information-storage device 3-1. The data blocks D52 and D62 and parities P7 and P8 with respect to the data blocks D71, D72, D81 and D82 are stored in the external information-storage device 3-2. The data blocks D72 and D82 and parities P5 and P6 with respect to the data blocks D51, D52, D61 and D62 are stored in the external information-storage device 3-3.

When the external information-storage device 3-4 is added and data blocks D91, D92, D93, D01, D02 and D03 are supplied to the RAID system, the data blocks D91 and D01 are stored in the external information-storage device 3-1, the data blocks D92 and D02 are stored in the external information-storage device 3-2 and the data blocks D93 and D03 are stored in the external information-storage device 3-3. Additionally, parities P9 and P0 with respect to the data blocks D91, D92, D93, D01, D02 and D03 are stored in the external information-storage device 3-4.

If the external information storage devices 3-1 and 3-2 become full after the data blocks D91, D92, D93, D01, D02 and D03 are stored, data blocks cannot be stored any more in the RAID system even if the external information-storage device 3-5 is added. Accordingly, as indicated by dotted circles in FIG. 7, unusable empty storage areas remain in the external information-storage devices 3-3, 3-4 and 3-5.

SUMMARY OF THE INVENTION

It is a general object of the present invention to provide an improved and useful information storage system in which the above-mentioned problems are eliminated.

A more specific object of the present invention is to provide an information-storage device which can store data evenly in each of a plurality of external information-storage devices even if the number of external information-storage devices provided in the information storage system is changed.

In order to achieve the above-mentioned object, there is provided according to one aspect of the present invention an information storage system for storing information, comprising:

a plurality of information storage devices;

a division processing unit dividing the information to be stored in the information storage devices and distributing the divided information to the information storage devices; and a division control unit controlling the division processing unit so as to divide the information in accordance with a number of the information storage devices, wherein, when the number of the information storage devices is changed, the division control unit controls the division processing unit so that the information stored in the information storage devices is divided by a dividing method suitable for the number of the information storage devices after being changed.

According to the present invention, when a structure of the information storage devices is changed, that is, when the number of the information storage devices provided in the information storage system is increased or decreased, the previously stored information is divided in accordance with the new structure of the information storage devices. Accordingly, the information previously stored in the information storage devices can be automatically divided according to the dividing method suitable for the new structure and redistributed to the information storage devices of an increased or decreased number. Additionally, the information stored after the structure is changed can be divided by the dividing method suitable for the new structure of the information storage devices. Thus, a storage area of each of the information storage devices can be efficiently used.

Additionally, there is provided according to another aspect of the present invention a processor readable medium storing program code for causing a computer to store information in a plurality of information storage devices in accordance with the dividing method mentioned above.

Other objects, features and advantages of the present invention will become more apparent from the following detailed description when read in conjunction with the accompanied drawings.

BRIEF DESCRIPTION OF THE DRAWINGS

FIG. 9A is an illustration for explaining contents of a division information managing table;

FIG. 9B is an illustration for explaining contents of a parity division information managing table;

FIG. 13A is an illustration for explaining division information and parity division information of a data block;

FIG. 13B is an illustration for explaining the division information and the parity division information of another data block;

FIG. 15 is an illustration for explaining division information when restripping is performed;

FIG. 18 is an illustration for explaining contents of division information and parity division information according to the second embodiment of the present invention;

FIG. 20 is an illustration for explaining contents of the division information and the parity division information according to the second embodiment of the present invention after one of the devices is removed;

FIGS. 27A and 27B are illustrations for explaining contents of the division information before restripping and after the external information-storage devices are added;

FIG. 29 is an illustration for explaining contents of the division information when the redistribution or restripping is performed;

FIG. 33 is an illustration for explaining contents of the division information before restripping and after the external information-storage devices are added;

FIG. 36 is an illustration for explaining contents of the division information when the redistribution or restripping is performed;

FIG. 40 is an illustration for explaining contents of the division information before one of the external information-storage devices is removed;

FIG. 43 is an illustration for explaining contents of the division information when the redistribution or restripping is performed;

DETAILED DESCRIPTION OF THE PREFERRED EMBODIMENTS

Figure 1:
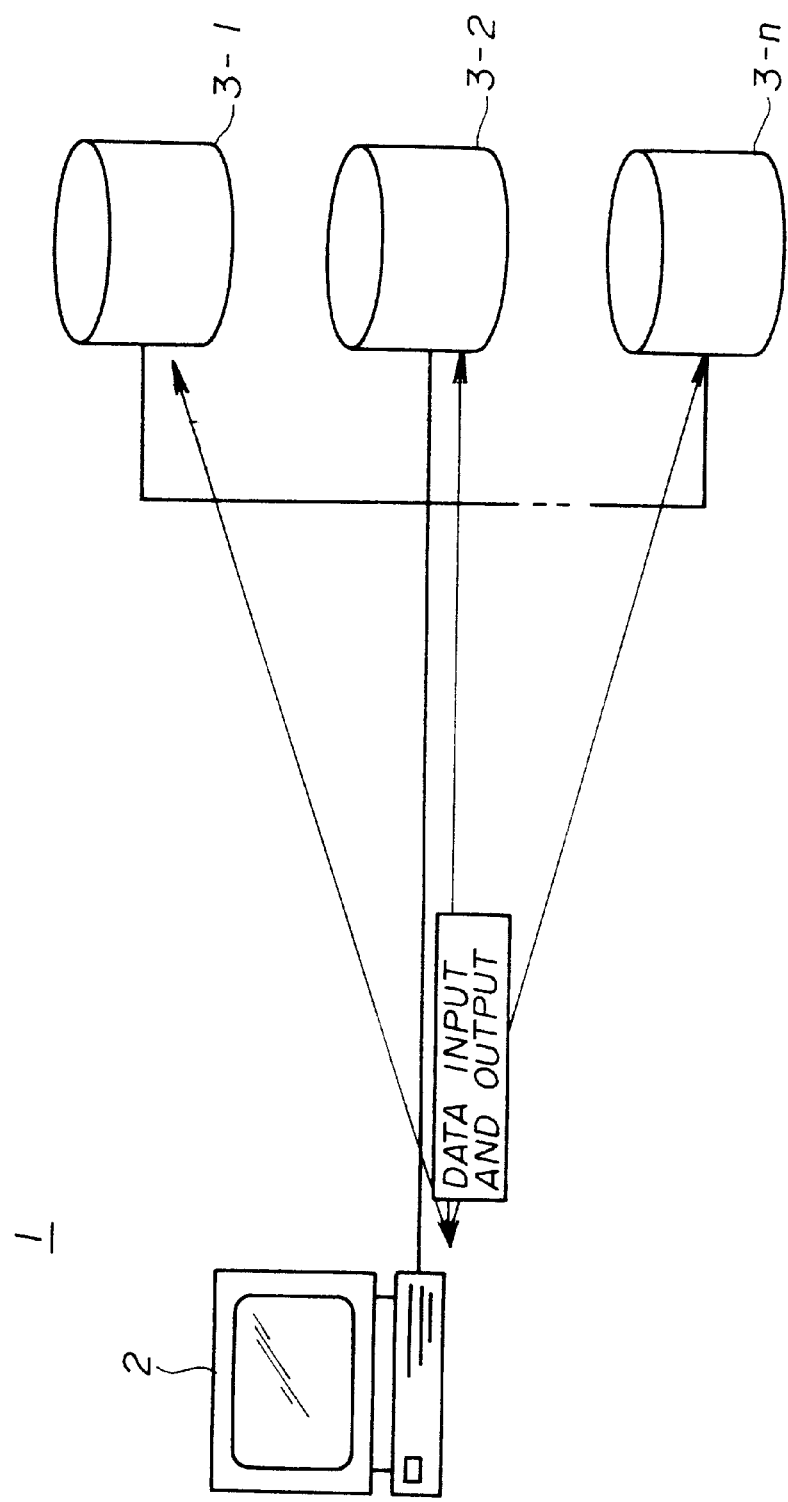
FIG. 1 is an illustration for explaining a system structure of a conventional RAID system.
Figure 2:
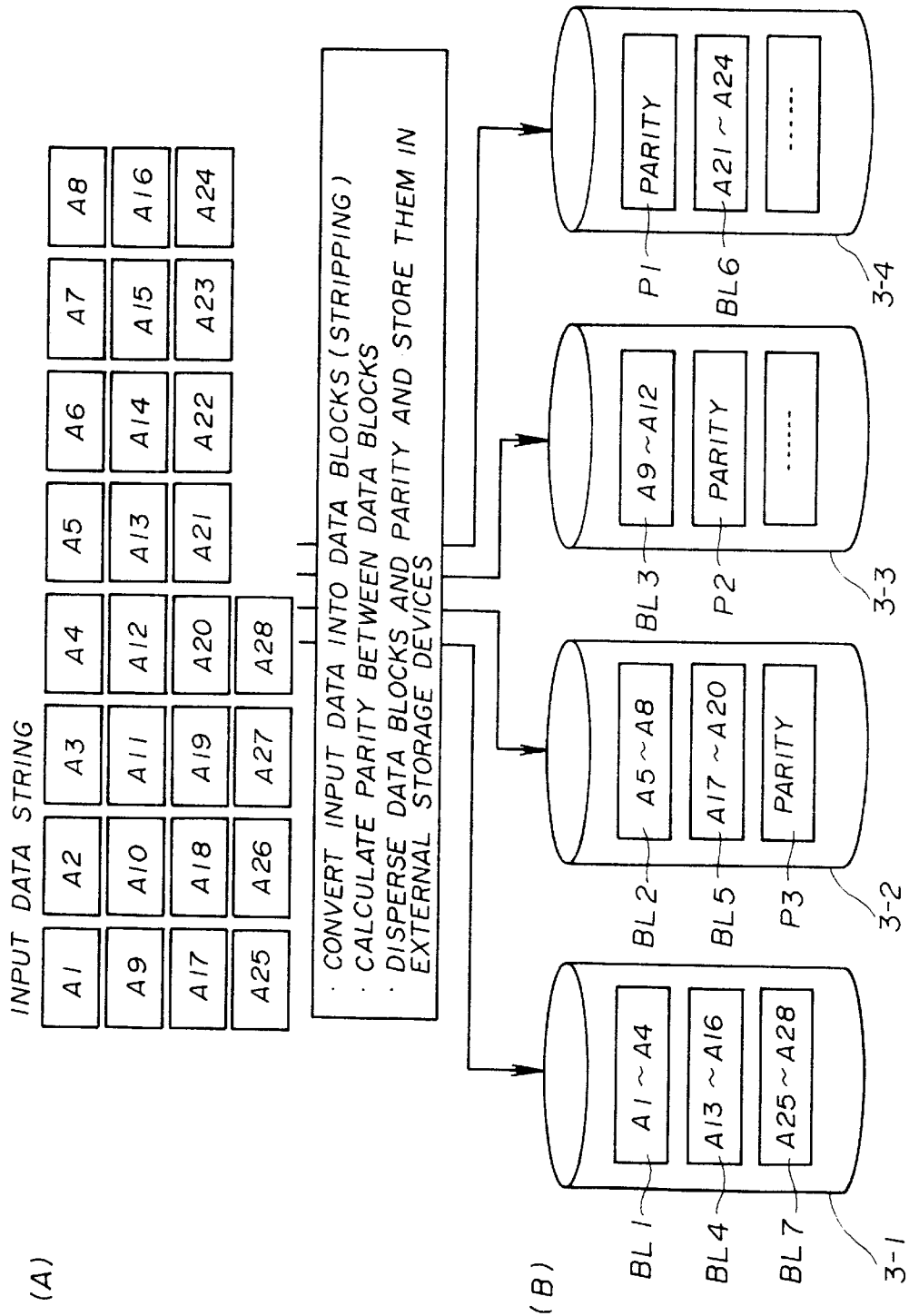
FIG. 2 is an illustration for explaining a process performed in a conventional RAID system.
Figure 3:
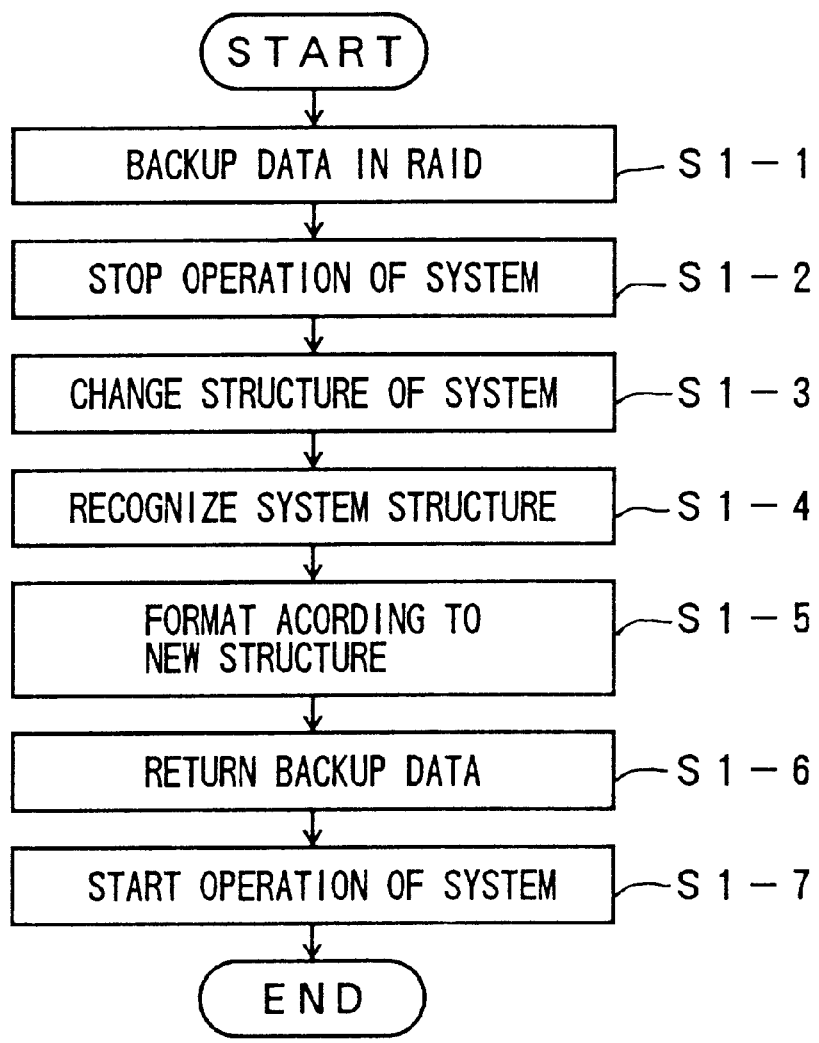
FIG. 3 is a flowchart of an operation for changing a structure of a conventional RAID system.
Figure 4:
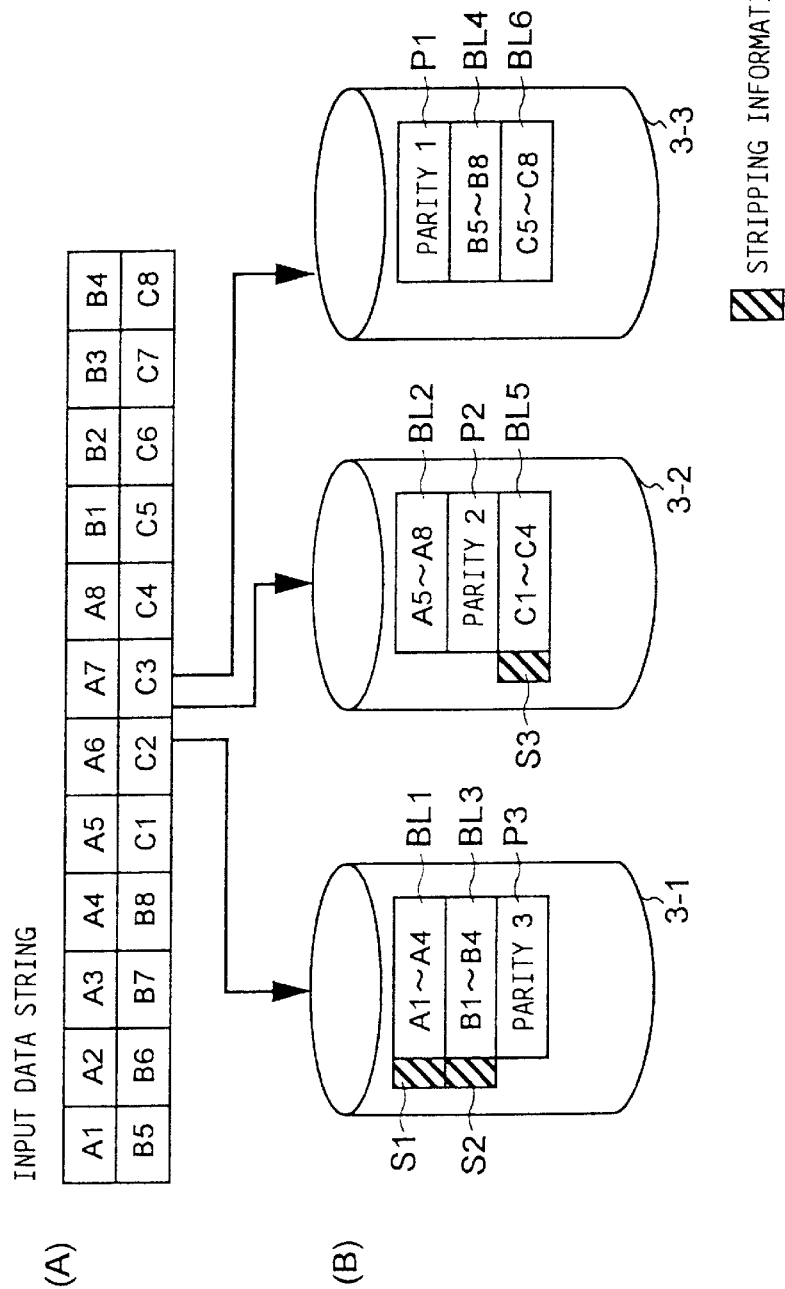
FIG. 4 is an illustration for explaining a state of a RAID system of which a structure is changeable without stopping an operation.
Figure 5:
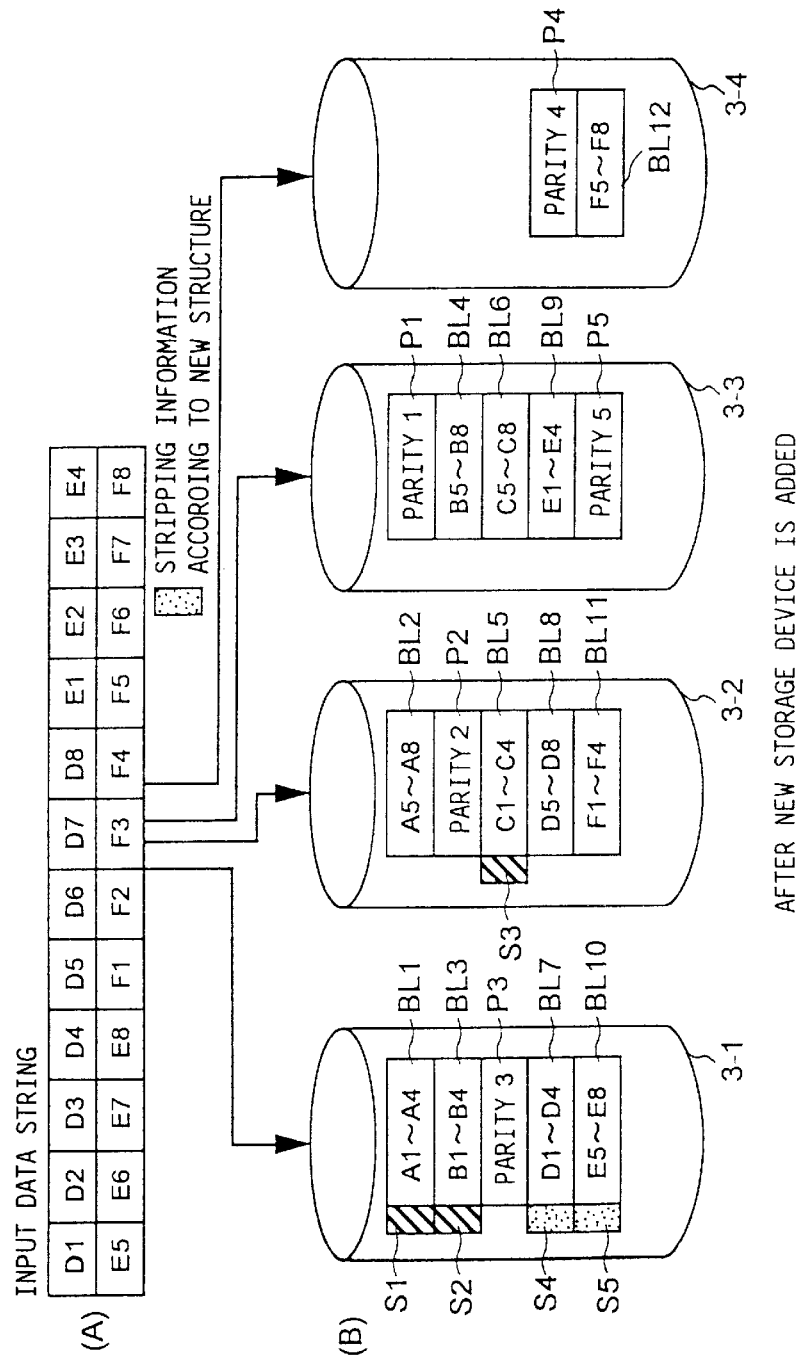
FIG. 5 is an illustration for explaining a state of the RAID system shown in FIG. 4 after a change is made.
Figure 6:
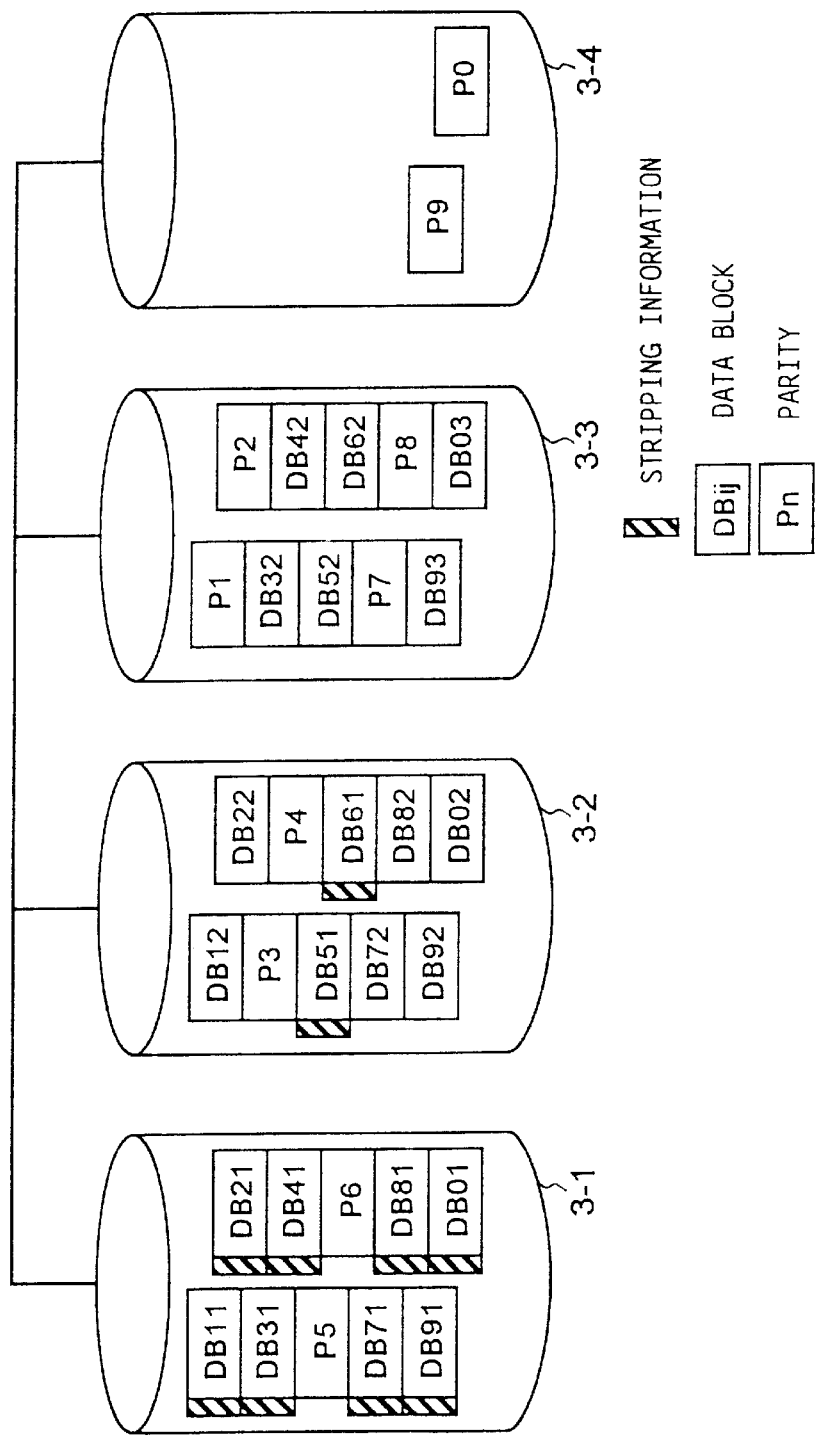
FIG. 6 is an illustration for explaining a problem that occurs when a structure of the RAID system is changed.
Figure 7:
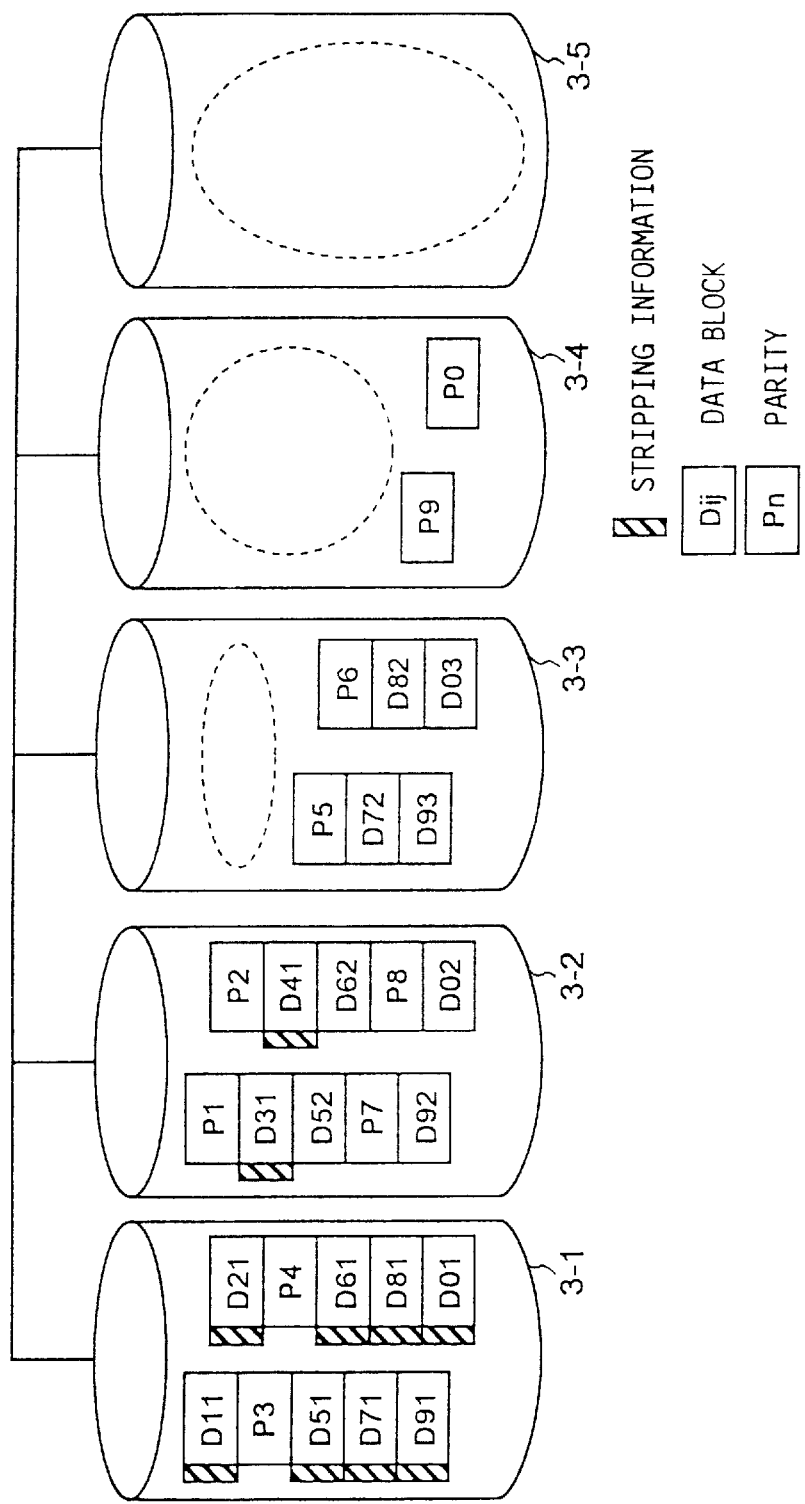
FIG. 7 is an illustration for explaining a problem which may occur in the conventional RAID system.
Figure 8:
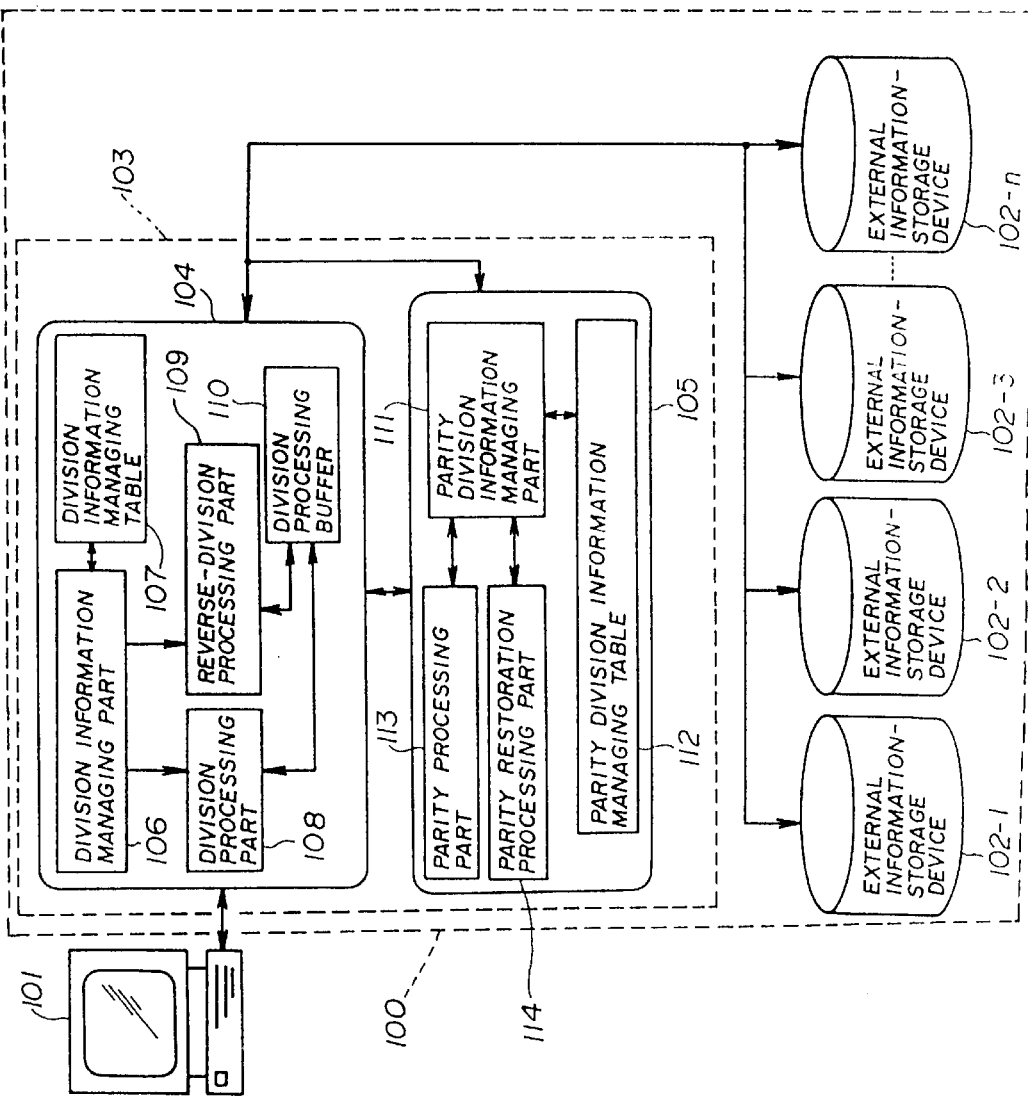
FIG. 8 is a block diagram of an information storage system according to a first embodiment of the present invention.

A description will now be given, with reference to FIG. 8, of a first embodiment of the present invention. FIG. 8 is a block diagram of an information storage system 100 according to the first embodiment of the present invention.

The information storage system 100 is connected to a host computer 101 via an interface so as to store information supplied from the host computer 101. The information supplied by the host computer 101 is distributed to a plurality of external information-storage devices 102-1 to 102-n. The information storage system 100 has a structure generally referred to as a RAID system.

In the information storage system 100, the information supplied by the host computer 101 is divided into a plurality of data blocks by a control unit 103. The control unit 103 also restores the original information in accordance with the data blocks retrieved from the external information-storage devices 102-1 to 102-n. In this embodiment, the control unit 103 is achieved by software installed in the host computer 101.

The control unit 103 comprises a division control section 104 and a parity control section 105. The division control section 104 comprises a division information managing part 106, a division information managing table 107, a division processing part 108, a reverse-division processing part 109 and a division processing buffer memory 110.

The division information managing part 106 manages the division information managing table 107. The stripping information is used when the information supplied by the host computer 101 is divided into a plurality of data blocks. That is, the stripping information includes information regarding addresses, a unit of a data block and a number of data blocks.

The division processing part 108 distributes (disperses) or strips information supplied from the host computer 101 to the external information-storage devices 102-1 to 102-n in accordance with the stripping information managed by the division information managing part 106.

The reverse-division processing part 109 restore the original information from the data blocks retrieved from the external information-storage devices 102-1 to 102-n in accordance with the stripping information managed by the division information managing part 106.

The division processing buffer memory 110 stores the data blocks obtained by the division processing part 108 on an individual external information-storage device basis. Additionally, the division processing buffer memory 110 stores the data blocks read from the external information-storage devices and supplies the data blocks to the reverse-division processing part 109.

The parity control unit comprises a parity division information managing part 111, a parity division information managing table 112, a parity processing part 113 and a parity restoration processing part 114. The parity division information managing part 111 manages parity division information stored in the parity division information table 112. The parity processing part 113 calculates error correction codes to be stored in the external information-storage devices 102-1 to 102-n in accordance with the parity division information managed by the parity division information managing part 111. The parity restoration processing part 114 corrects data errors in accordance with the parity division information managed by the parity division managing part 111 so as to restore the original information.

FIG. 9A is an illustration for explaining contents of the division information managing table 107. In this embodiment, the external information-storage devices are hard disk drives, and the number of hard disk drives is three. The division information managing table 107 includes information regarding the number of hard disk drives, hard disk drive identification information for identifying each hard disk drive, logical block addresses (LBA) at which data is stored and a number of consecutive LBAs. In FIG. 9A, for example, the number of divisions is "3", and the LBA of the hard disk drive information with respect to the hard disk drive HDD1 is "LBA1" and the number of consecutive LBAs is "2".

FIG. 9B is an illustration for explaining contents of the parity division information managing table 112. The parity division information includes parity identification information regarding one of the hard disk drives storing the parity, an address (LBAP) at which the parity is stored, and a unit of parity for calculation. In the example shown in FIG. 9A, the parity identification information indicates that parity is stored in the hard disk drive HDD4, and the parity is stored at an address of LBAP. Additionally, the number of consecutive LBAs is "2" and the unit of calculation of the parity is 1,024 bytes.

Figure 10:
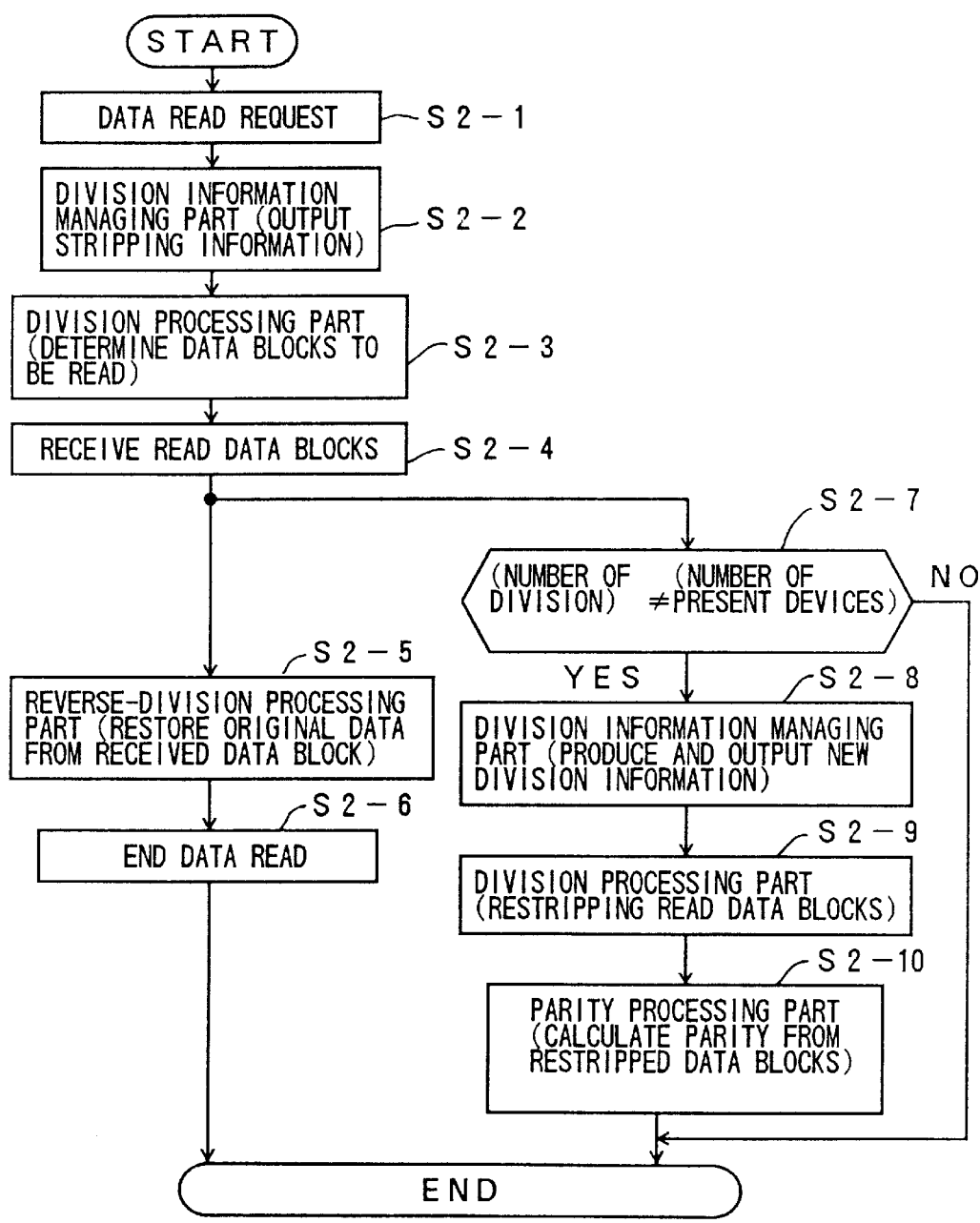
FIG. 10 is a flowchart of a process performed by a control unit shown in FIG. 8.

A description will now be given, with reference to FIG. 10, of a process performed by the control unit 103. FIG. 10 is a flowchart of the process performed by the control unit 103 according to the first embodiment of the present invention.

In FIG. 10, when a data read request is supplied from the host computer 101 in step S2-1, the division information managing part 106 refers to the division information managing table 107, in step S2-2, so as to obtain the current stripping information. Thereafter, in step S2-3, the data blocks to be read are determined by the division processing part 108, and access to the determined data blocks is started. Then, in step S2-4, the control unit 103 receives the data blocks to be output.

After the data blocks to be output are received, the reverse-division processing part 109 restores, in step S2-5, the original information from the received data blocks. Then the data reading operation is ended.

Additionally, after the data blocks to output are received, it is determined, in step S2-7, whether or not the number of divisions indicated by the division information matches (n−1) which is the number (n) of external information-storage devices 102-1 to 102-n minus 1. That is, it is determined whether or not a number obtained by adding parity to the number of divisions of the data matches the number of external information-storage devices 102-1 to 102-n.

If it is determined, in step S2-7, that the number of divisions is equal to (n−1), it can be determined that the number of external information-storage devices matches the number indicated by the stripping information, and there is not a change in the structure of the external information-storage devices. Accordingly, in this case, the routine is ended.

On the other hand, if it is determined, in step S2-7, that the number of divisions is not equal to (n−1), it can be determined that the number of external information-storage devices does not match the number indicated by the stripping information and a change has been made in the structure of the external information-storage devices. In this case, the routine proceeds to step S2-8 so as. to produce new stripping information which indicates the new structure of the external information-storage devices. The new stripping information is stored in the division information managing table 107, and the routine proceeds to step S2-9. In step S2-9, the read data blocks are divided or stripped in accordance with the new stripping information set in the step S2-8. Then, in step S2-10, the parity processing part 113 calculates parities for the data blocks obtained by dividing or stripping in accordance with the new stripping information. The obtained parities and the new data blocks are stored in the external information-storage devices.

Figure 11:
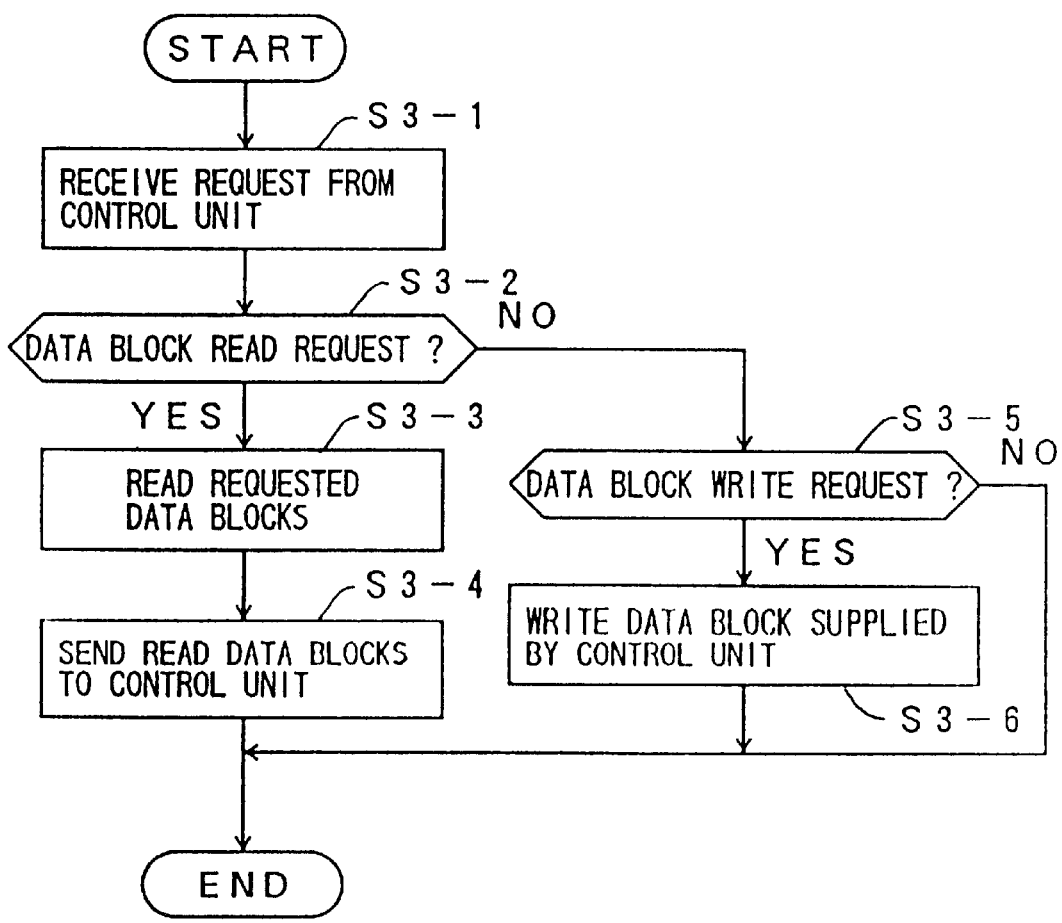
FIG. 11 is a flowchart of an operation performed by one of the external information-storage devices shown in FIG. 8.

A description will now be given, with reference to FIG. 11, of an operation of one of the external information-storage devices 102-1 to 102-n. FIG. 11 is a flowchart of an operation performed by one of the external information-storage devices according to the first embodiment of the present invention.

When one of the external information-storage devices 102-1 to 102-n receives, in step S3-1, a request from the control unit 103, it is determined, in step S3-2, whether or not the received request is a data block read request. if the received request is the data block read request, the routine proceeds to step S3-3. In step S3-3, data blocks indicated by the data block read request are read, and the read data blocks are output to the control unit 103 in step S3-4.

On the other hand, if it is determined, in step S3-2, that the received request is not a data block read request, the routine proceeds to step S3-5. In step S3-5, it is determined whether or not the received request is a data block write request. If it is determined that the received request is a data block write request, the routine proceeds to step S3-6. In step S3-6, the data blocks supplied by the control unit 103 are written in the external information-storage device.

Figure 12:
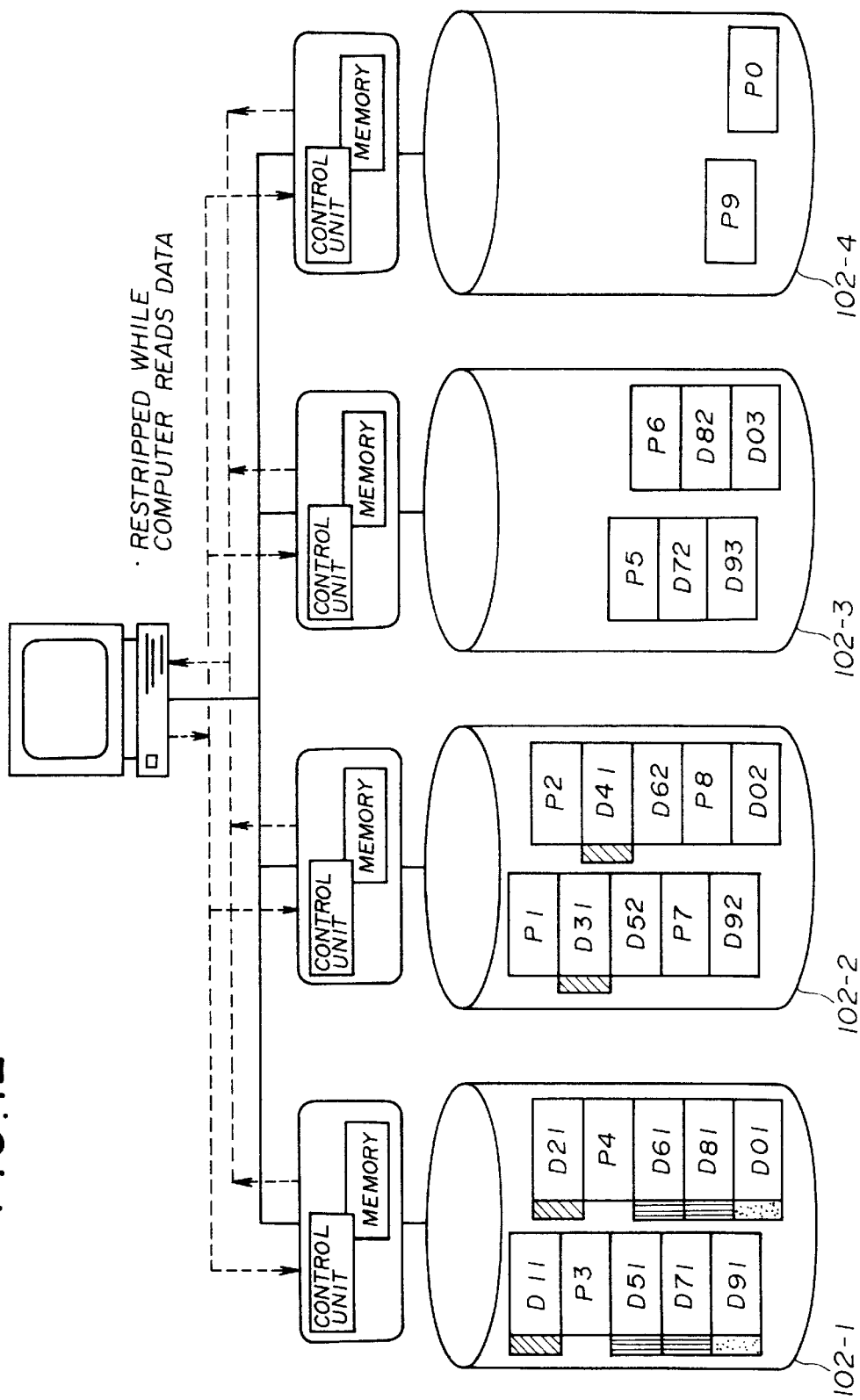
FIG. 12 is an illustration for explaining a state of data stored in the external information-storage devices before the data is read.

FIG. 12 is an illustration for explaining a state of data stored in the external information-storage devices before the data is read.

The state of the external information-storage devices is established after the following operations. Initially, the external information-storage devices 102-1 and 102-2 were connected to the host computer 101, and data blocks D11, D21, D31 and D41 and their parities P1, P2, P3 and P4 were stored in the respective external information-storage devices 102-1 and 102-2. Thereafter, the external information-storage device 102-3 was added to the system, and data blocks D51, D52, D61, D62, D71, D72, D81 and D82 and their parities P5, P6, P7 and P8 were stored in the three external information-storage devices 102-1, 102-2 and 102-3. After that, the external information-storage device 102-4 was added to the system, and data blocks D91, D92, D93, D01, D02 and D03 and their parities P9 and P0 were dispersed and stored in the four external information-storage devices 102-1 to 102-4.

FIGS. 13A and 13B are illustrations for explaining the division information before the data blocks in the external information-storage devices are redistributed or restripped. FIG. 13A indicates the division information and the parity division information of the data block D11. FIG. 13B indicates the division information and the parity division information of the data block D51.

Since the data block D11 is stored in the two external information-storage devices 102-1 and 102-2, the data block D11 must be stripped into data which is stored in one of the external information-storage devices and a parity stored in the other one of the external information-storage devices 102-1 and 102-2. Accordingly, the division information includes, as shown in FIG. 13A, the number of divisions being set to "1", the HDD identification number being set to "HDD1" and the logical block address being set to "LBA-D11" which is assigned to the external information-storage device 102-1 (HDD1). Additionally, the number of data blocks is indicated as "1". Further, the parity information is set so that the parity 1 is stored at the logical block address "LBA-D11-P" which is assigned to the external information-storage device 102-2 (HDD2). Additionally, the parity division information includes the number of data blocks of the parity being set to "1" and an amount of data being set to "512 bytes".

Additionally, when the external information-storage device 102-3 is added, the data and the parity are dispersed so as to be stored in the three external information-storage devices 102-1 to 102-3. At this time, the division information is set so that the number of divisions is set to "2" as shown in FIG. 13B. Additionally, the division information is set so that the block data D51 is stored at a logical block address "LBA-D51" assigned to the external information-storage device 102-1 and the block data D52 is stored at a logical block address "LBA-D52" assigned to the external information-storage device 102-2. Further, the number of divisions for each of the data blocks D51 and D52 is set to "1".

Further, the parity division information is set so that the parity 5 is stored at the logical block address "LBA-D51-D52-P" which is assigned to the external information-storage device 102-3 (HDD3). Additionally, the parity division information includes the number of data blocks of the parity being set to "1". and an amount of data being set to "512 bytes".

It should be noted that when the data blocks D11, D21, D31, D41, D51, D52, D61, D62, D71, D72, D81 and D82 are read, redistribution or restripping is performed.

Figure 14:
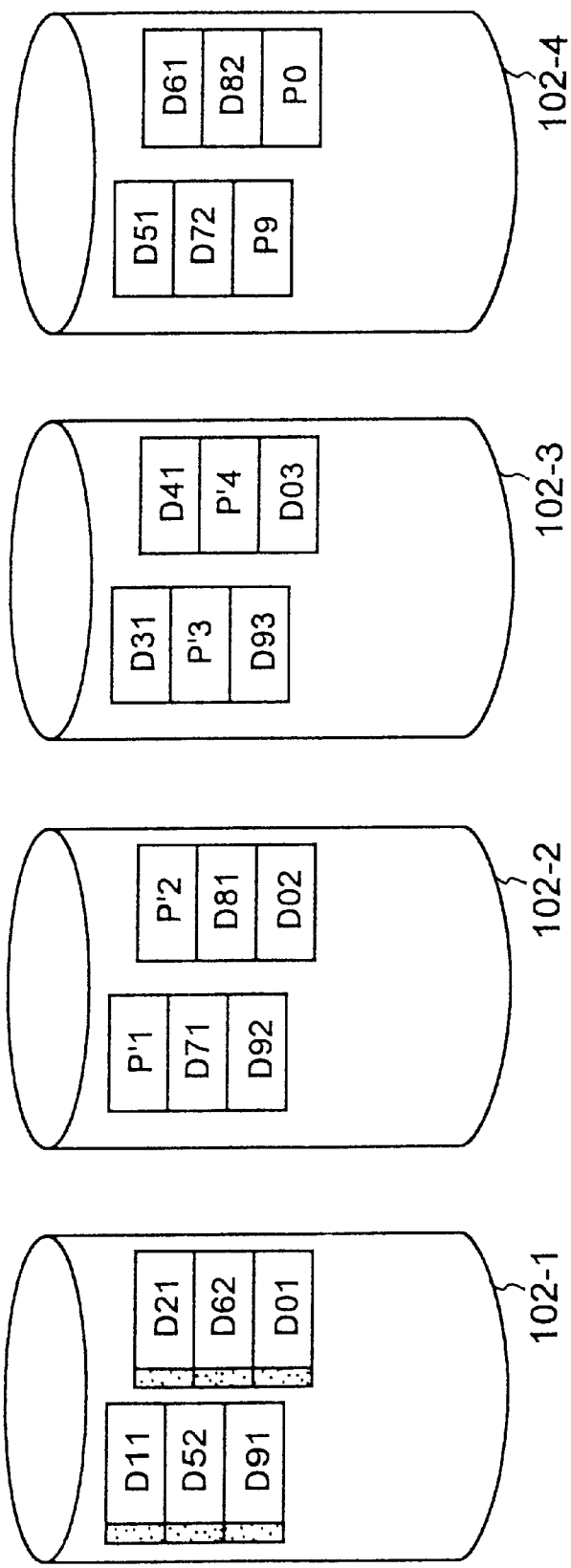
FIG. 14 is an illustration for explaining a state of data blocks stored in the external information-storage devices after the data blocks are read.

FIG. 14 is an illustration for explaining a state of data stored in the external information-storage devices after the data is read.

When the data blocks D11, D21, D31, D41, D51, D52, D61, D62, D71, D72, D81 and D82 are read, the data blocks D11, D31 and D51 together with their parity P'1 are dispersed and stored in the four external information-storage devices 102-1 to 102-4. Similarly, the data blocks D21, D41 and D61 together with their parity P'2 are dispersed and stored in the four external information-storage devices 102-1 to 102-4. The data blocks D52, D71 and D72 together with their parity P'3 are dispersed and stored in the four external information-storage devices 102-1 to 102-4. The data blocks D62, D81 and D82 together with their parity P'4 are dispersed and stored in the four external information-storage devices 102-1 to 102-4. It should be noted that the data blocks D91, D92 and D93 and the data blocks D01, D02 and D03 together with their parities P9 and P0 are dispersed and stored in the four external information-storage devices 102-1 to 102-4 when those data blocks are initially stored in the four external information-storage devices 102-1 to 102-4. Thus, positions of those data blocks and parities remain unchanged.

FIG. 15 is an illustration for explaining division information when restripping is performed. When the external information-storage device 102-4 is added to the system and the number of the external information-storage devices is increased to four, redistribution or restripping is performed in accordance with the division information shown in FIG. 15 when the data and parity stored in the external information-storage devices 102-1 to 102-4 are read. Since the parity must be stored in one of the four external information-storage devices, the data blocks are dispersed so as to be stored in the three external information-storage devices other than the external information-storage device storing the parity. Accordingly, the number of divisions is set to "3". In the example shown in FIG. 15, the data block D11 is stored at a logical block address LBA-D11 assigned to the external information-storage device 102-1 (HDD1), the data block D31 is stored at a logical block address LBA-D31 assigned to the external information-storage device 102-3 (HDD3) and, the data block D51 is stored at a logical block address LBA-D51 assigned to the external information-storage device 102-4 (HDD4).

Further, the parity division information is set so that the parity P'1 is stored at the logical block address "LBA-D11-D31-D51-P" which is assigned to the external information-storage device 102-2 (HDD2). Additionally, the parity division information includes the number of data blocks of the parity being set to "1" and an amount of data being set to "512 bytes".

According to the above-mentioned operation, the data blocks read from the external information-storage devices are redistributed or restripped each time a data read request is made by the host computer 101. Accordingly, there is no need to stop the system operation each time when the structure of the external information-storage devices is changed.

Additionally, data blocks, which were stored before the structure of the external information-storage devices is changed, are redistributed or restripped when the data blocks are read after the change is made so as to match the structure after the change. Thus, the data blocks are evenly distributed to the external information-storage devices after the number of external information-storage devices is changed, which results in even storage of the data blocks in the external information-storage devices without waste of their storage capacity.

It should be noted that although the description is given of the case in which the number of external information-storage devices is increased in the above-mentioned embodiment, the present invention can be applied when the number of external information-storage devices is decreased.

Figure 16:
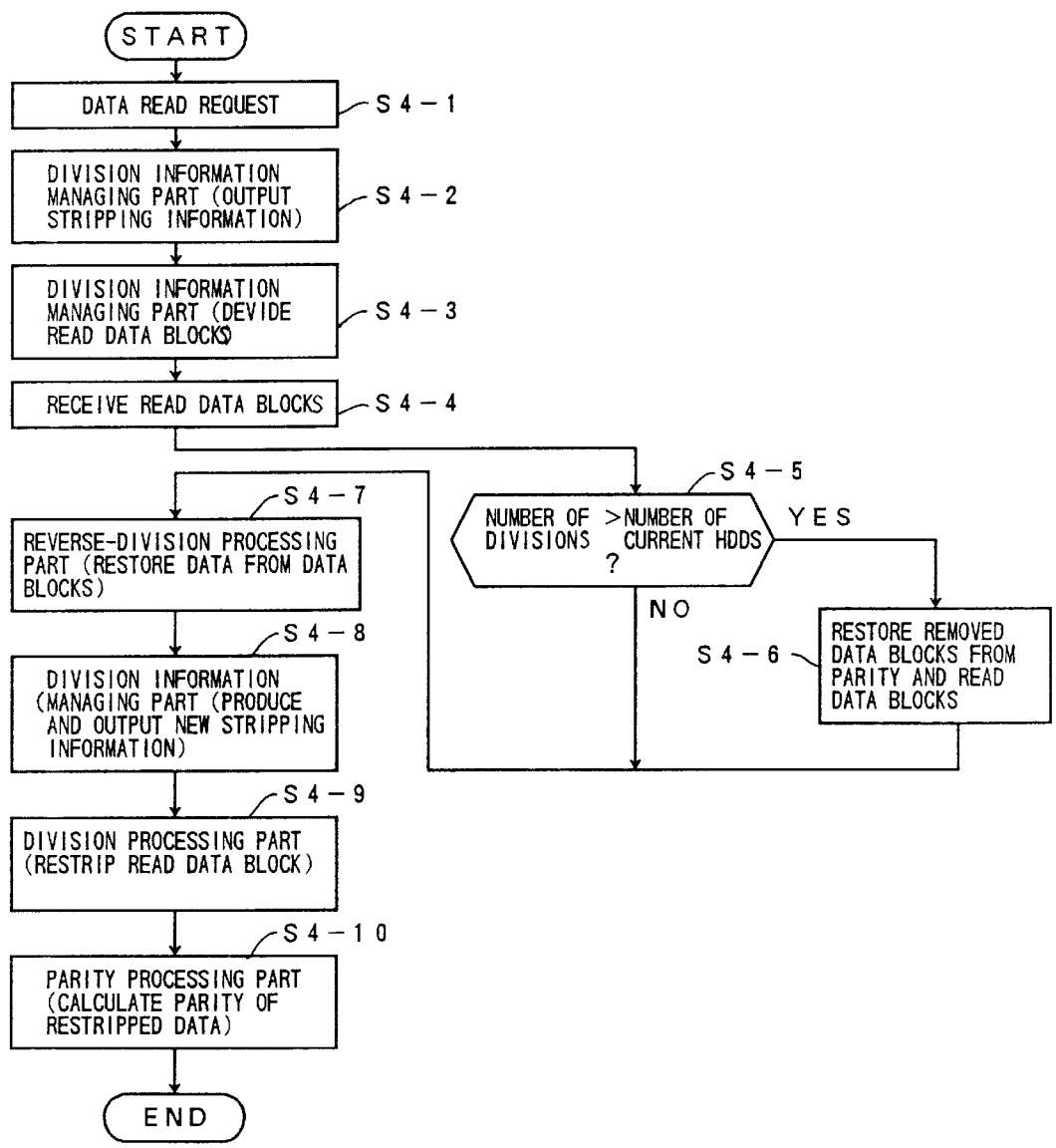
FIG. 16 is a flowchart of a process performed by a control unit provided in an information storage system according to a second embodiment of the present invention.

A description will now be given, with reference to FIG. 16, of a second embodiment of the present invention. FIG. 16 is a flowchart of a process performed by a control unit provided in an information storage system according to the second embodiment of the present invention. A structure of the information storage system according to the second embodiment is the same as that of the first embodiment shown in FIG. 8, and a description thereof will be omitted.

When a data read request is sent, in step S4-1, from the host computer 101, the stripping information is read, in step S4-2, from the division information managing part 106. Then, in step S4-3, the data blocks to be read from the external information-storage devices 102-1 to 102-n are determined, and the external information-storage devices 102-1 to 102-n are accessed. Accordingly, the external information-storage devices 102-1 to 102-n perform the process shown in FIG. 11 so as to send the requested data blocks to the control unit 103.

In step S4-4, the control unit 103 receives the requested data blocks from the external information-storage devices 102-1 to 102-n. It is then determined, in step S4-5, whether or not the number of divisions currently set in the division information is greater than a number of external information-storage devices 102-1 to 102-n currently provided in the system. It should be noted that the number (n) of the external information-storage devices currently provided in the system is detected and managed by the control unit 103.

If it is determined, in step S4-5, that the number of divisions set in the division information is greater than the number (n) of the external information-storage devices 102-1 to 102-n, it can be determined that at least one external information-storage device has been removed. In this case, if the removed device is one of the external information-storage devices storing the data blocks, the data blocks stored in the removed external information-storage device are restored, in step S4-6, in accordance with the parity and read data blocks by the parity restoration processing part 114. Additionally, if the removed device is one of the external information-storage devices storing the parities, the data blocks corresponding the parities stored in the removed device are used without the parities. Thereafter, the routine proceeds to step S4-7. If it is determined, in step S4-5, that the number of divisions set in the division information is not greater than the number (n) of the external information-storage devices 102-1 to 102-n, the routine proceeds to step S4-7.

In step S4-7, the original information to be output is restored by the reverse-division processing unit 109. Then, in step S4-8, the division information is updated in accordance with the number (n) of external information-storage devices currently provided in the system, and the produced division information is set in the division information managing table 107. In step S4-9, the read data blocks are redistributed or restripped by the division processing part 108 in accordance with the division information set in step S4-8. Then, in step S4-10, parities are calculated by the result of restripping, and the restripped data blocks and the calculated parities are stored in the external information-storage devices 102-1 to 102-n.

Figure 17:
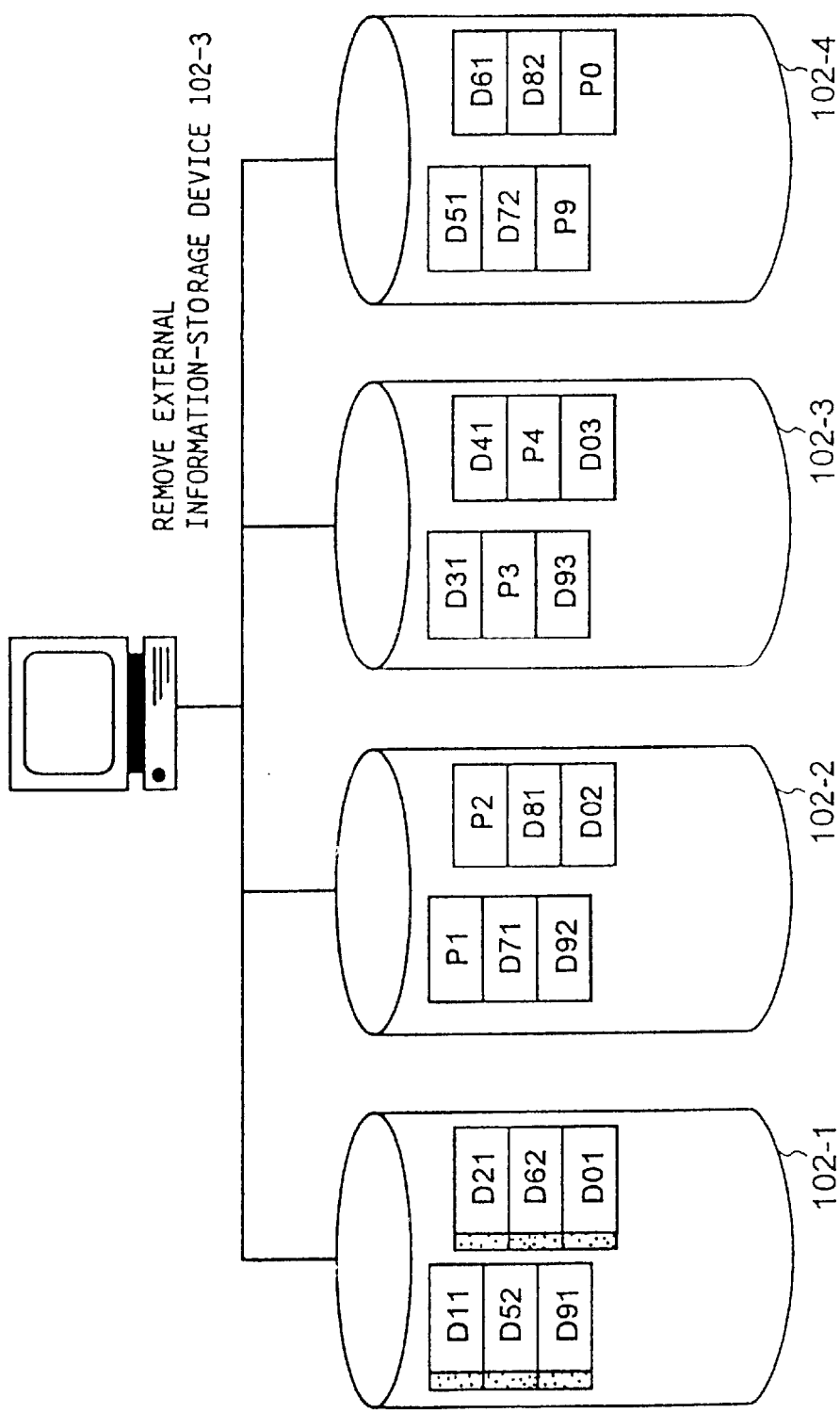
FIG. 17 is an illustration for explaining a state of data blocks stored in the external information-storage devices before one of the devices is removed.

FIG. 17 is an illustration for explaining a state of data blocks stored in the external information-storage devices before one of the devices is removed. In FIG. 17, the four external information-storage devices 102-1 to 102-4 evenly store data blocks D11, D21, D31, D41, D51, D61, D52, D62, D71, D72, D81, D82, D91, D01, D92, D02, D93, D03 and their parities P1 to P4, P9 and P0.

FIG. 18 is an illustration for explaining contents of the division information and the parity division information according to the second embodiment of the present invention.

With respect to the data blocks D11, D21, D31, D41, D51 and D61, the number of divisions is set to "3" as shown in FIG. 18. The data blocks D11 and D21 are stored at the logical block address "LBA-D11" assigned to the external information-storage device 102-1 (HDD1). Accordingly, the number of data blocks is "2". The data blocks D31 and D41 are stored at the logical block address "LBA-D31" assigned to the external information-storage device 102-3 (HDD3). Accordingly, the number of data blocks is "2". The data blocks D51 and D61 are stored at the logical block address "LBA-D51" assigned to the external information-storage device 102-4 (HDD4). Accordingly, the number of data blocks is "2".

The parity information is set so that the parities P1 and P2 are stored at the logical block address "LBA-D11-D31-D51-P" which is assigned to the external information-storage device 102-2 (HDD2). Additionally, the parity division information includes the number of data blocks of the parity being set to "2" and an amount of data being set to "1,024 bytes".

If the external information-storage device 102-3 is removed, the total number of external information-storage devices becomes "3". Accordingly, redistribution or restripping is performed so that the data blocks and the parities are stored in the three external information-storage devices 12-1, 12-2 and 12-4.

Figure 19:
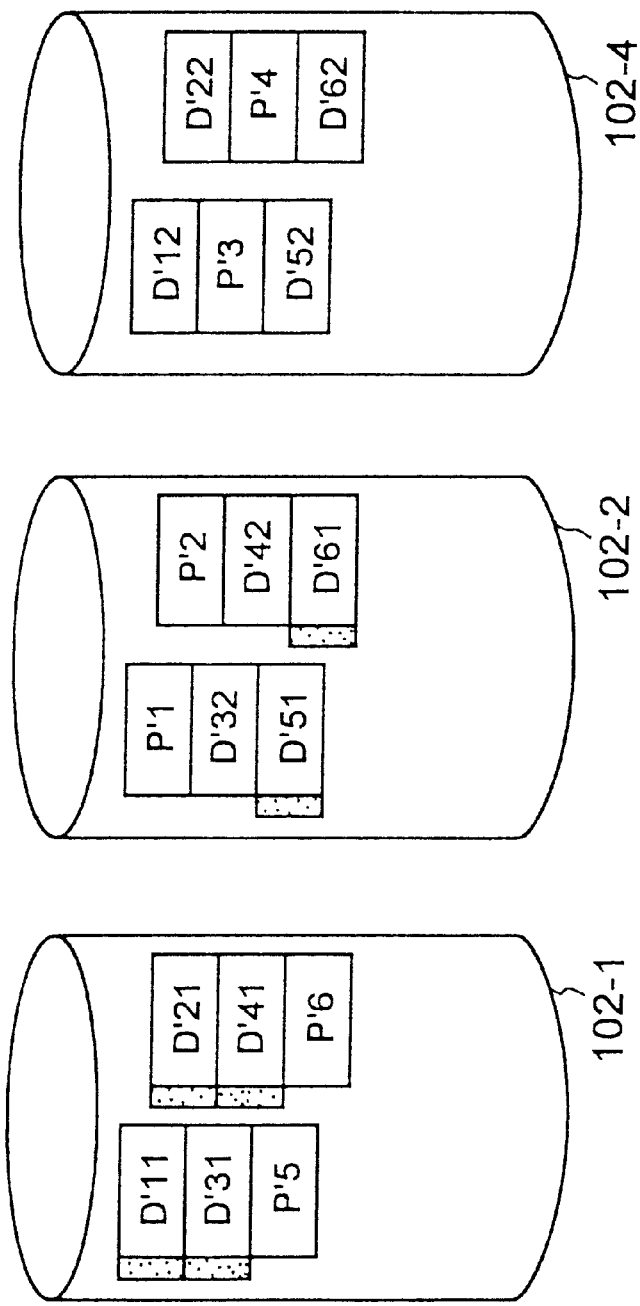
FIG. 19 is an illustration for explaining a state of data blocks stored in the external information-storage devices after one of the devices is removed.

FIG. 19 is an illustration for explaining a state of data blocks stored in the external information-storage devices after one of the devices is removed. FIG. 20 is an illustration for explaining contents of the division information and the parity division information according to the second embodiment of the present invention after one of the devices is removed.

After the number of external information-storage devices becomes "3", the number of divisions of the data blocks becomes "2" since parity is assigned to one of the three external information-storage devices. Additionally, the number of data blocks stored in a single external information-storage device becomes "3".

For example, data blocks D'11, D'12, D'21 and D'22 are gathered and redistributed so that the data blocks D'11and D'21 are stored in the external information-storage device 12-1 (HDD1) and the data blocks D'12 and D'22 are stored in the external information-storage device 102-4 (HDD4). At this time, the parities P'1 and P'2 are assigned to the external information-storage device 102-2 (HDD2), and are stored in the logical block addresses starting at "LBA-D'11-D'12-P" over three block lengths corresponding to 1,536 bytes.

As mentioned above, when one of the external information-storage devices is removed, the data blocks previously stored in the removed external information-storage device can be restored by referring to the parities, and the restored block data can be stored in the present external information-storage devices.

Although the data blocks are stored in the new structure of the external information-storage devices after one of the external information-storage devices has been removed in the above-mentioned embodiment, a plurality of external information-storage devices may be removed by transferring data blocks stored in the external information-storage devices to be removed to other external information-storage devices and redistributing all data blocks to the external information-storage devices other than the external information-storage devices to be removed.

Additionally, in the present embodiment, although the external information-storage device is simply removed, the number of external information-storage devices may be reduced while increasing a storage capacity of the external information-storage devices other than the external information-storage devices being removed.

Figure 21:
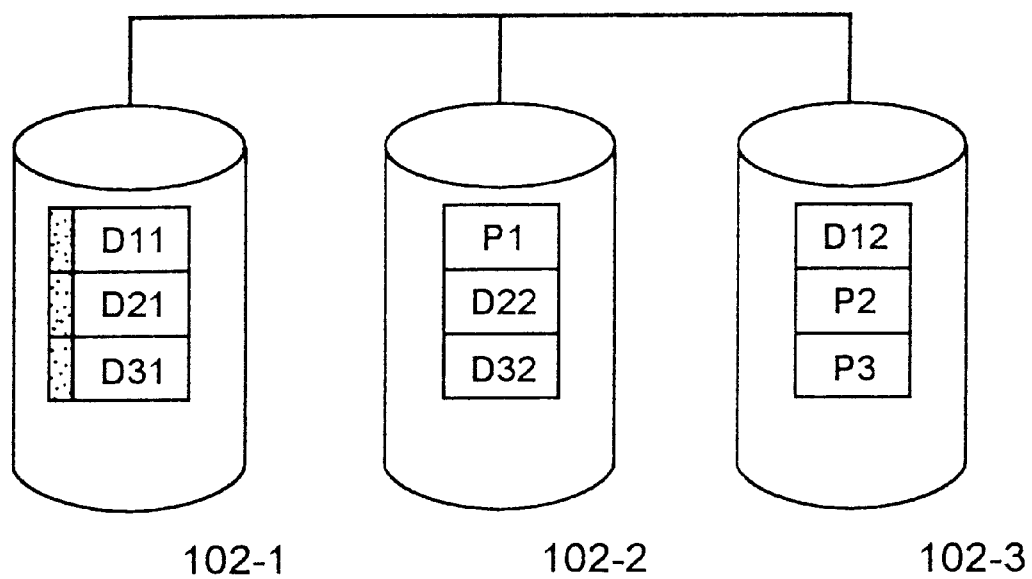
FIG. 21 is an illustration for explaining a state of external information-storage devices provided in an information storage system according to a third embodiment of the present invention before a number of the external information-storage devices is changed.
Figure 22:
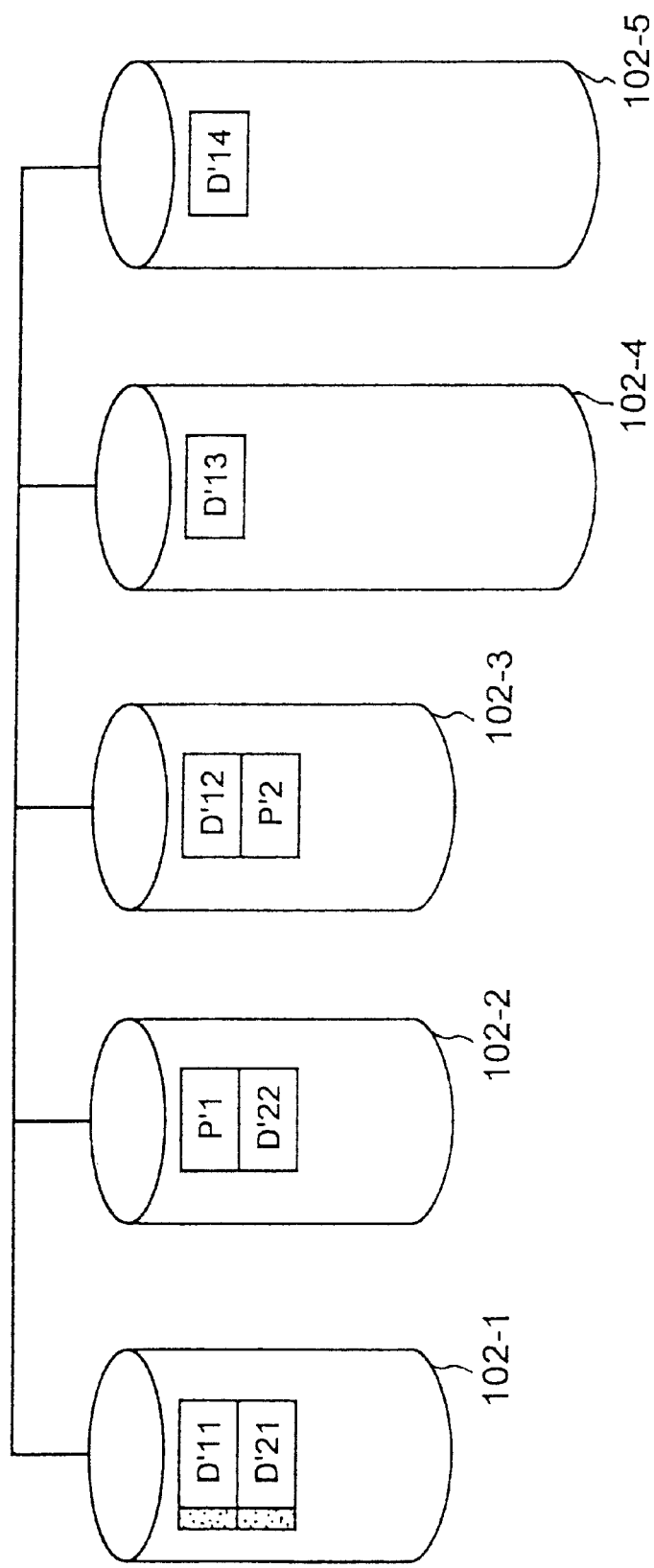
FIG. 22 is an illustration for explaining a state of the external information-storage devices provided in the information storage system according to the third embodiment of the present invention when the number of the external information-storage devices is being changed.
Figure 23:
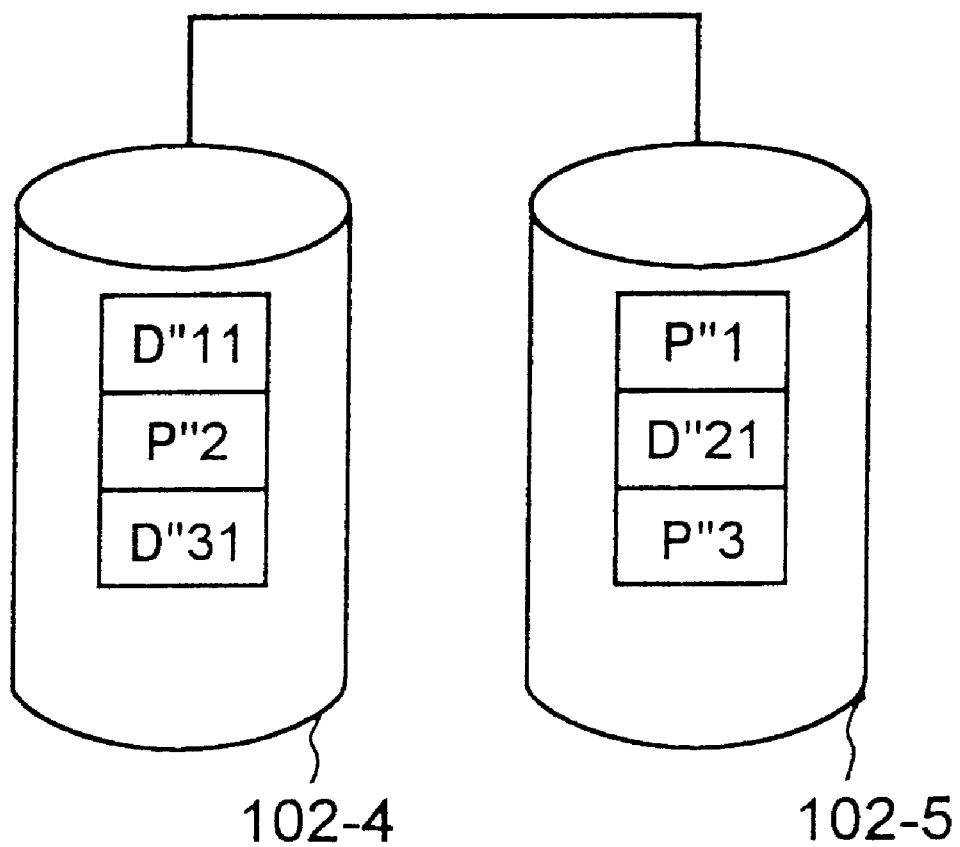
FIG. 23 is an illustration for explaining a state of the external information-storage devices provided in the information storage system according to the third embodiment of the present invention after the number of the external information-storage devices was changed.

FIG. 21 is an illustration for explaining a state of external information-storage devices provided in an information storage system according to a third embodiment of the present invention before a number of the external information-storage devices is changed. FIG. 22 is an illustration for explaining a state of the external information-storage devices provided in the information storage system according to the third embodiment of the present invention when the number of the external information-storage devices is being changed. FIG. 23 is an illustration for explaining a state of the external information-storage devices provided in the information storage system according to the third embodiment of the present invention after the number of the external information-storage devices was changed.

Referring to FIGS. 21 to 23, a description will be given of a case in which a system provided with three external information-storage devices 102-1 to 102-3 is changed to a system provided with two external information-storage devices 102-4 and 102-5 having a large capacity.

In FIG. 21, the data blocks D11, D12, D21, D22, D31 and D32 and their parities P1, P2 and P3 are evenly distributed to the three external information-storage devices 102-1, 102-2 and 102-3. When the system is in the state shown in FIG. 21, the external information-storage devices 102-4 and 102-5 are added to the system. Each of the external information-storage devices 102-4 and 102-5 has a capacity larger than that of each of the external information-storage devices 102-1 to 102-3. In such a case, since the external information-storage devices 102-4 and 102-5 are added to the system, the data blocks and the parities previously stored in the external information-storage devices 102-1 to 102-3 are redistributed to the five external information-storage devices 102-1 to 102-5.

Thereafter, by sequentially removing the three external information-storage devices 102-1 to 102-3, the data blocks D'11, D'12, D'13, D'14, D'21 and D'22 are finally converted into data blocks D"11, D"21 and D"31. Then, the block data D"11, D"21 and D"31 and their parities P"1, P"2 and P"3 are distributed to the external information-storage devices 102-4 and 102-5.

According to the present embodiment, a structure of the system can be freely changed such as in the above-mentioned case in which the number of external information-storage devices is reduced while a storage capacity is increased. It should be noted that although the frame structure of the data blocks is changed and the new parities are produced in the above-mentioned embodiment when the external information-storage devices are added, the external information-storage devices may be added without changing the frame structure of the data blocks and parities.

Figure 24:
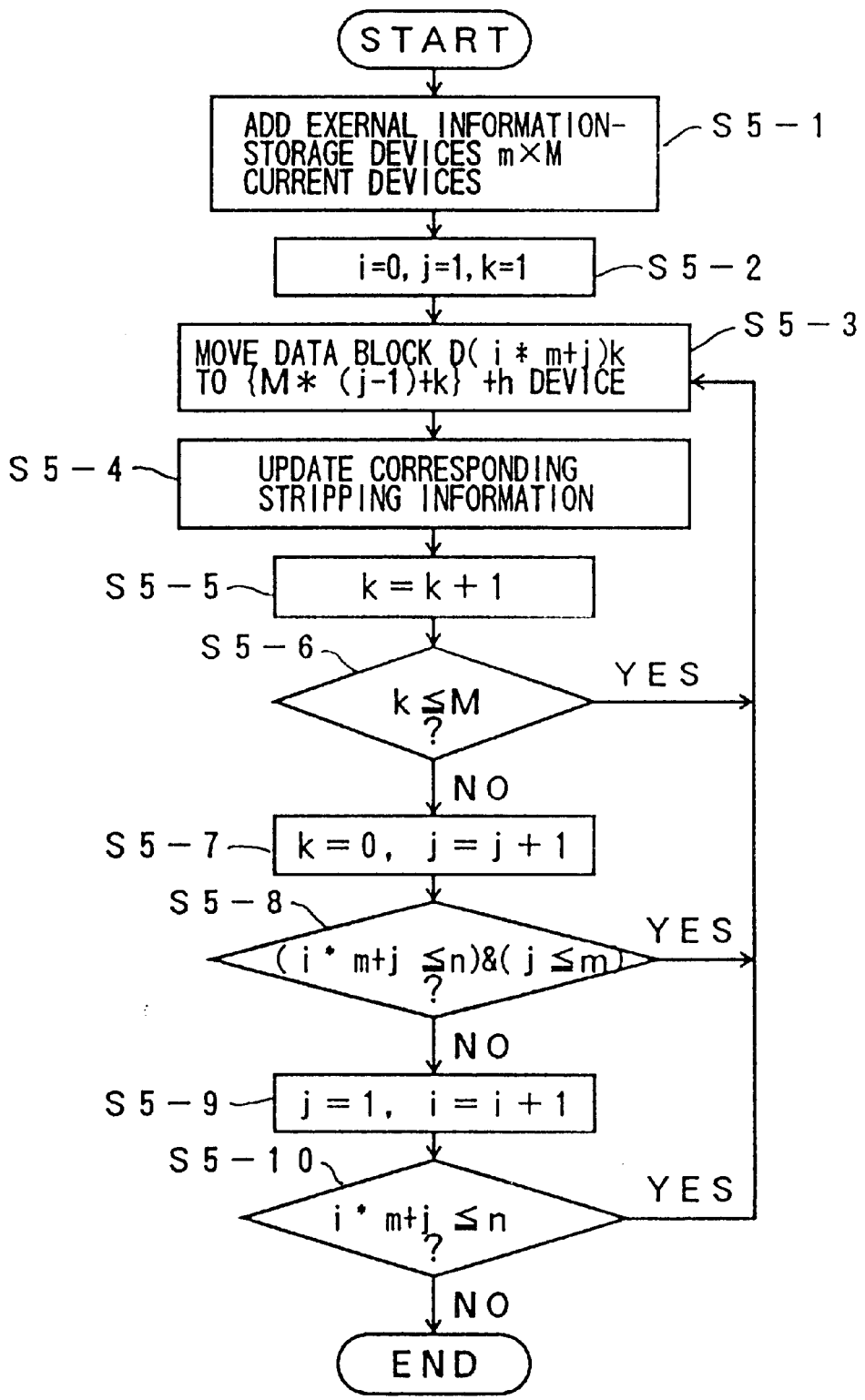
FIG. 24 is a flowchart of a process performed by a control unit provided in an information storage system according to a fourth embodiment of the present invention.

A description will now be given, with reference to FIG. 24, of a fourth embodiment of the present invention. FIG. 24 is a flowchart of a process performed by a control unit provided in an information storage system according to the fourth embodiment of the present invention. A structure of the information storage system according to the fourth embodiment is the same as that of the first embodiment shown in FIG. 8, and a description thereof will be omitted.

In this embodiment, it is assumed that M external information-storage devices 102-1 to 102-M are currently provided in the system, and the data blocks and parities are evenly distributed to the M external information-storage devices 102-1 to 102-M. In step S5-1, (m−1)M external information-storage devices 102-M+1 to 102-mM are added to the system. In step S5-2, variables i, j and k are set to i=0, j=1 and k=1, respectively. Thereafter, data blocks D(i*m+j)k stored in the external information-storage devices 102-1 to 102-M are transferred to the external information-storage device 102-M*(J−1)+k which is one of the newly added external information-storage devices 102-M+1 to 102-mM. Thereafter, in step S5-4, stripping information corresponding to the transferred data blocks and parities are updated.

In step S5-5, the variable k is incremented by 1. It is then determined, in step S5-6, whether or not the variable k is equal to or smaller than M which is the number of the external information-storage devices 102-1 to 102-M. If the variable k is equal to or smaller than M, the routine returns to step S5-3 so as to transfer the subsequent data block. If the variable k is not equal to or smaller than M, the routine proceeds to step S5-7. In step S5-7, the variable k is set 0 (k=0) and the variable j is incremented by 1 (j=j+1). It is then determined, in step S5-8, whether or not both a relationship (i*m+j)≦n and a relationship j≦m are satisfied. If both the relationship (i*m+j)≦n and the relationship j≦m are satisfied, the routine returns to step S5-3 so as to transfer the subsequent data block. If it is determined that at least one of the relationship (i*m+j)≦n and the relationship j≦m, is not satisfied, the routine proceeds to step S5-9. In step S5-9, the variable j is set to 1 (j=1) and the variable i is incremented by 1 (i=i+1). It is then determined, in step S5-10, whether or not a relationship i*m+j≦n is satisfied. If the relationship i*m+j≦n is satisfied, the routine returns to step S5-3 so as to transfer the subsequent data block. On the other hand, if it is determined, in step S5-10, that the relationship i*m+j≦n is not satisfied, the routine is ended.

Figure 25:
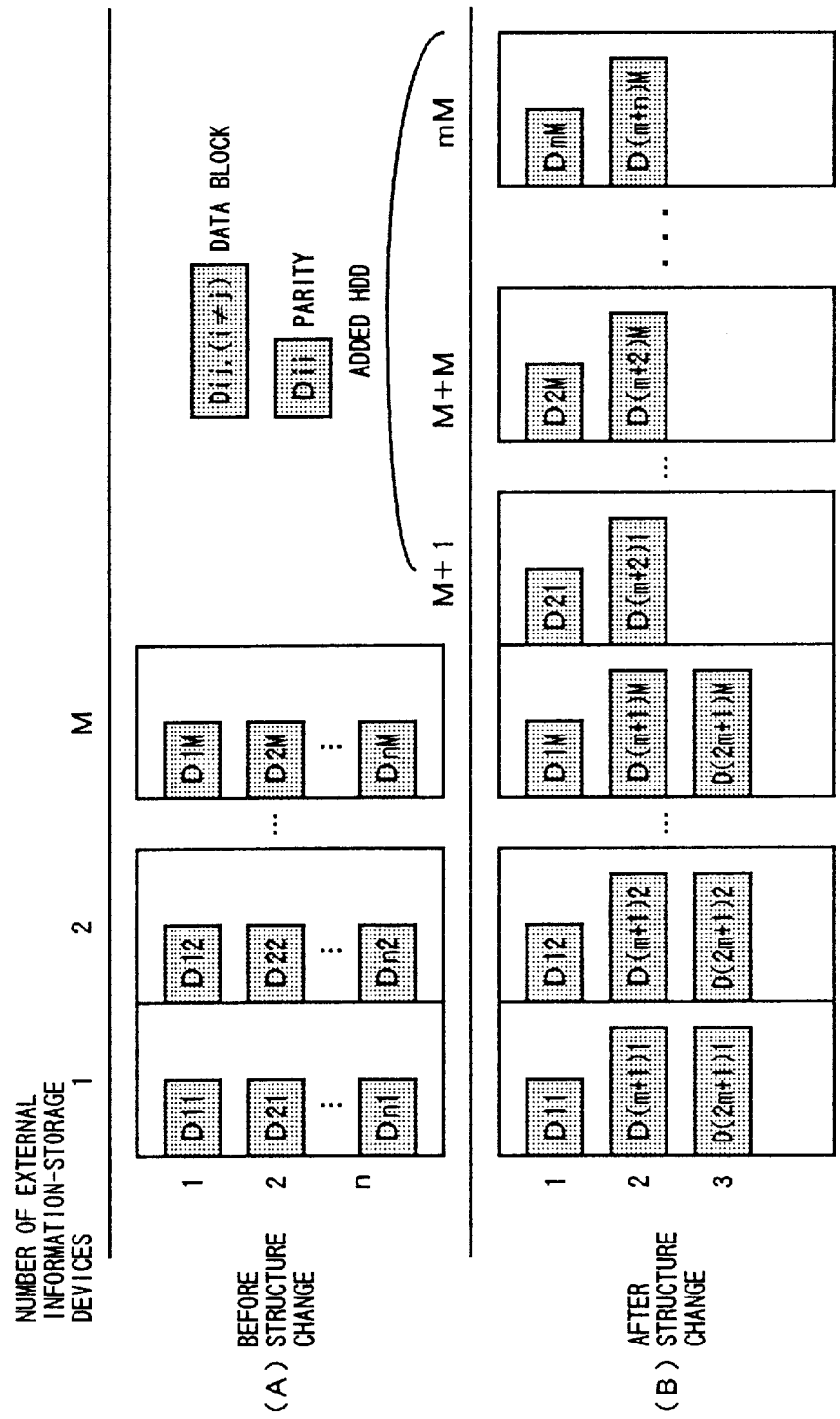
FIG. 25 is an illustration for explaining an operation of the information storage system according to the fourth embodiment of the present invention.

A description will now be given of an operation of the information storage system according to the fourth embodiment of the present embodiment. FIG. 25 is an illustration for explaining the operation of the information storage system according to the fourth embodiment of the present invention. FIG. 25-(A) shows a state of data blocks stored in the external information-storage devices 102-1 to 102-M before the external information-storage devices are added. FIG. 25-(B) shows a state of data blocks stored in the external information-storage devices 102-1 to 102-mM after the external information-storage devices 102-M+1 to 102-mM are added.

According to the operation shown in FIG. 24, when the data blocks are represented by Dij(j≠1) and the parities are represented as Dii, the data blocks and parities D21 to D2M . . . D(m+2)M to D(m+n)M are stored in the newly added external information-storage devices 102-M+1 to 102-mM as shown in FIG. 25-(B).

Figure 26:
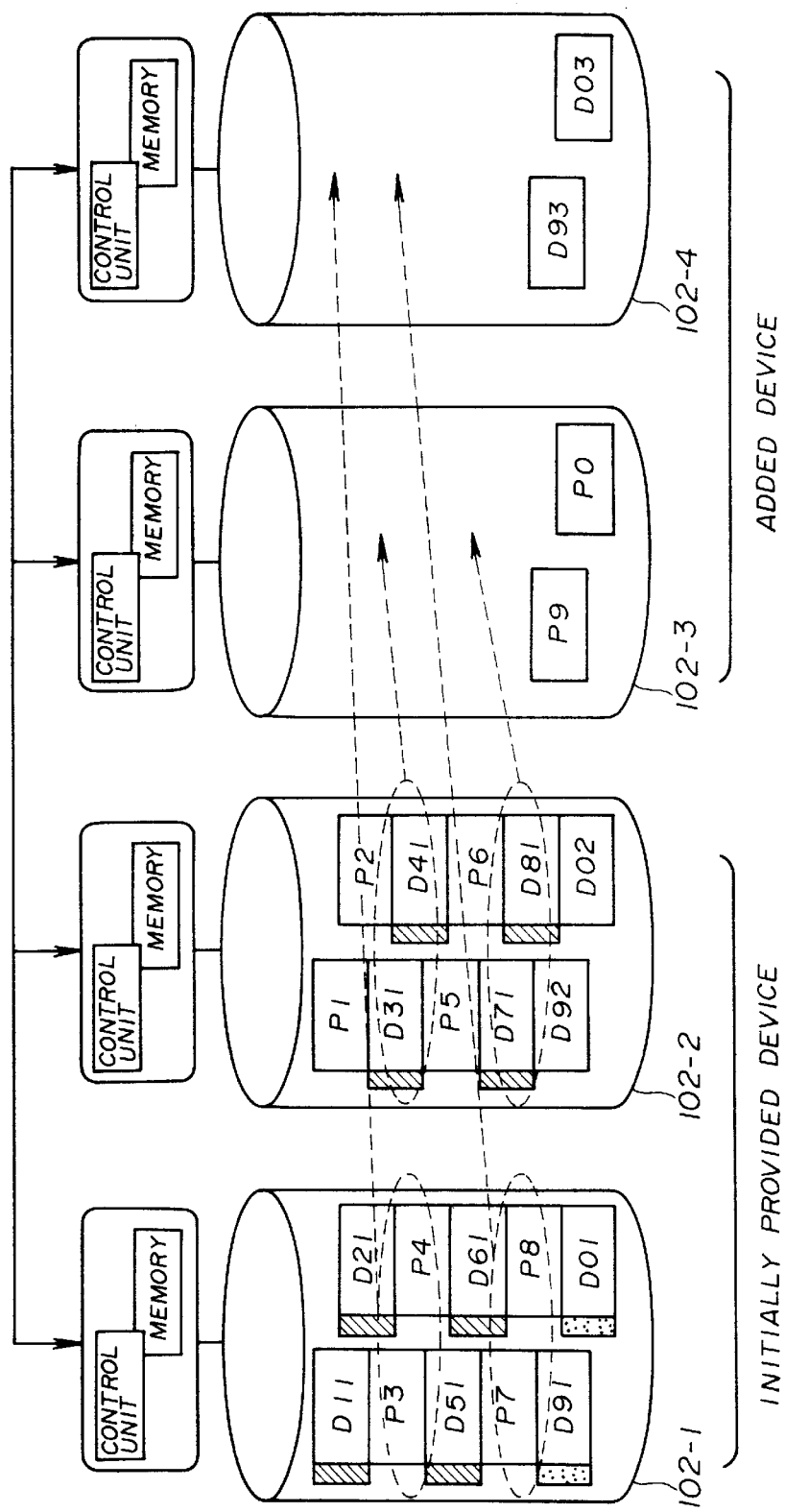
FIG. 26 is an illustration for explaining a state of data blocks stored in external information-storage devices provided in the information storage devices according to the fourth embodiment of the present invention after the external information-storage devices are added.

FIG. 26 is an illustration for explaining a state of data blocks stored in the external information-storage devices provided in the information storage devices according to the fourth embodiment of the present invention after the external information-storage devices are added. In FIG. 26, the external information-storage devices 102-3 and 102-4 are added to the system provided with the external information-storage devices 102-1 and 102-2.

In FIG. 26, data blocks D91, D92, D93, D01, D02 and D03, which are input after the external information-storage devices 102-3 and 102-4 are added, and parities P9 and P0 are evenly distributed to the four external information-storage devices 102-1 to 102-4. Additionally, data blocks D31, D41, D71 and D81 and parities P3, P4, P7 and P8, which have been stored in the original two external information-storage devices 102-1 and 102-2, are moved to the newly added external information-storage devices 102-3 and 102-4.

FIGS. 27A and 27B are illustrations for explaining contents of the division information before restripping and after the external information-storage devices are added.

As shown in FIG. 27A, the division information before restripping is set so that the data block D11 is stored at the logical block address "LBA-D11" of the external information-storage device 102-1 (HDD1) with the number of divisions being set to "1". Additionally, the parity division information is set so that the parity P1 of the data block D11 is stored at a logical block address "LBA-D11-P" assigned to the external information-storage device 102-2 (HDD2) by a single block corresponding to 512 bytes.

Similarly, as shown in FIG. 27B, the division information before restripping is set so that the data block D31 is stored at the logical block address "LBA-D31" of the external information-storage device 102-2 (HDD2) with the number of divisions being set to "1". Additionally, the parity division information is set so that the parity P3 of the data block D31 is stored at a logical block address "LBA-D31-P" assigned to the external information-storage device 102-1 (HDD1) with a single block corresponding to 512 bytes.

Figure 28:
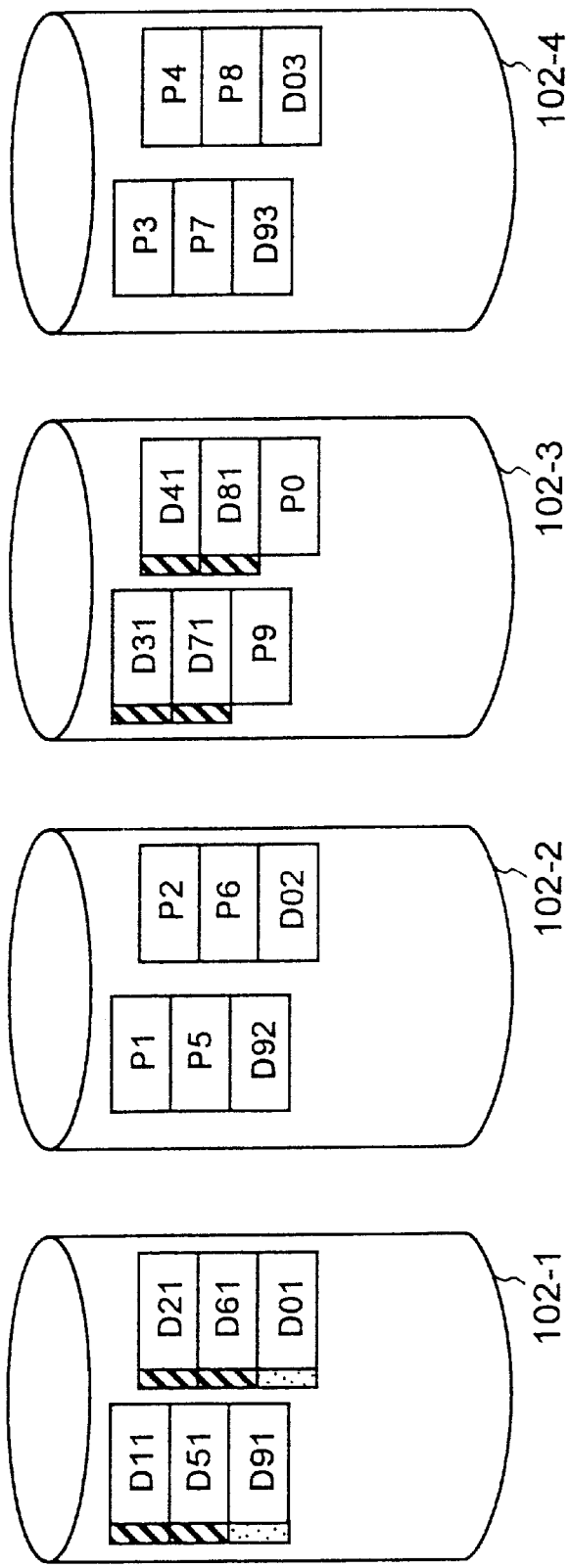
FIG. 28 is an illustration for explaining a state of data blocks stored in the external information-storage devices provided in the information storage devices according to the fourth embodiment of the present invention after the redistribution or restripping has been done.

FIG. 28 is an illustration for explaining a state of data blocks stored in the external information-storage devices provided in the information storage devices according to the fourth embodiment of the present invention after the redistribution or restripping has been done. After the redistribution or restripping is performed in accordance with the process shown in FIG. 24, the data blocks D31, D41, D71 and D81 and their parities P3, P4, P7 and P8 are redistributed to the external information-storage devices 102-1 to 102-4.

FIG. 29 is an illustration for explaining contents of the division information when the redistribution or restripping is performed.

In this embodiment, the redistribution or restripping can be done by changing only the addresses included in the division information of the data blocks D31, D41, D71 and D81 and the parities P3, P4, P7 and P8. For example, with respect to the data block D31, the HDD identification number "HDD1" is changed to "HDD3" and the logical block address "LBA-D31" is changed to "LBA-D31(new)". With respect to the parity P3, the HDD identification number "HDD1" is changed to "HDD4" and the logical block address "LBA-D31-P" is changed to "LBA-D31(N)-P".

According to the fourth embodiment of the present invention, when the external information-storage devices are added to the system, information previously stored in the initially provided external information-storage devices can be stored in the newly added external information-storage devices without changing the structure of the data blocks. Accordingly, there is no need to restructure the previously stored data blocks and to calculate the parities related to the restructure of the data blocks.

It should be noted that although the data blocks are moved without changing their size in the present embodiment, each of the data blocks may be divided into a plurality of blocks having a smaller size when they are moved.

Figure 30:
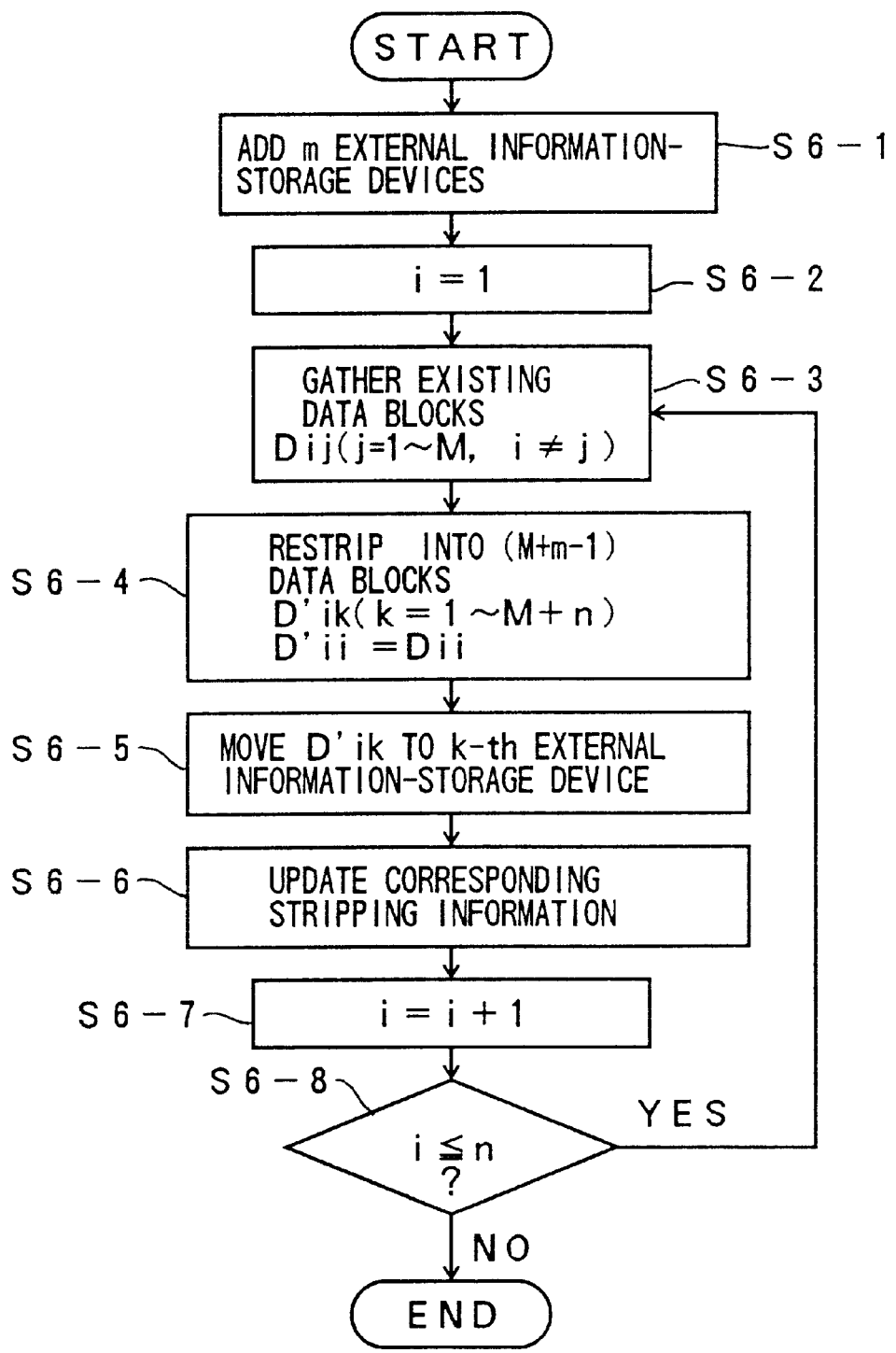
FIG. 30 is a flowchart of a process performed by a control unit provided in an information storage system according to a fifth embodiment of the present invention.

A description will now be given, with reference to FIG. 30, of a fifth embodiment of the present invention. FIG. 30 is a flowchart of a process performed by a control unit provided in an information storage system according to the fifth embodiment of the present invention. A structure of the information storage system according to the fifth embodiment is the same as that of the first embodiment shown in FIG. 8, and a description thereof will be omitted.

In this embodiment, it is assumed that M external information-storage devices 102-1 to 102-M are currently provided in the system, and the data blocks and parities are evenly distributed to the M external information-storage devices 102-1 to 102-M. In step S6-1, m external information-storage devices 102-M+1 to 102-M+m are added to the system. In step S6-2, a variable i is set to i=1. Thereafter, the existing data blocks Dij(j=1 to M, i≠j) are gathered in step S6-3. At this time, the parity of the data block Dij is represented as Dii. In step S6-4, the existing data blocks Dij gathered in step S6-3 are restripped into (M+m−1) data blocks. The thus-obtained data blocks are represented by D'ik (k=1 to M+m), and their parities are represented by D'ii. Then, in step S6-5, the data blocks D'ik obtained in step S6-4 are moved to the k-th external information-storage device 102-k. In step S6-6, the corresponding stripping information is updated. In step S6-7, the variable i is incremented by 1 (i=i+1). It is then determined, in step S6-8, whether or not the variable i is equal to or smaller than the number n of the data blocks. If the variable i is equal to or smaller than the number n of the data blocks, the routine returns to step S6-3 so as to repeat the process of steps S6-3 to S6-8. If the variable i is greater than the number n of the data blocks, the routine is ended.

Figure 31:
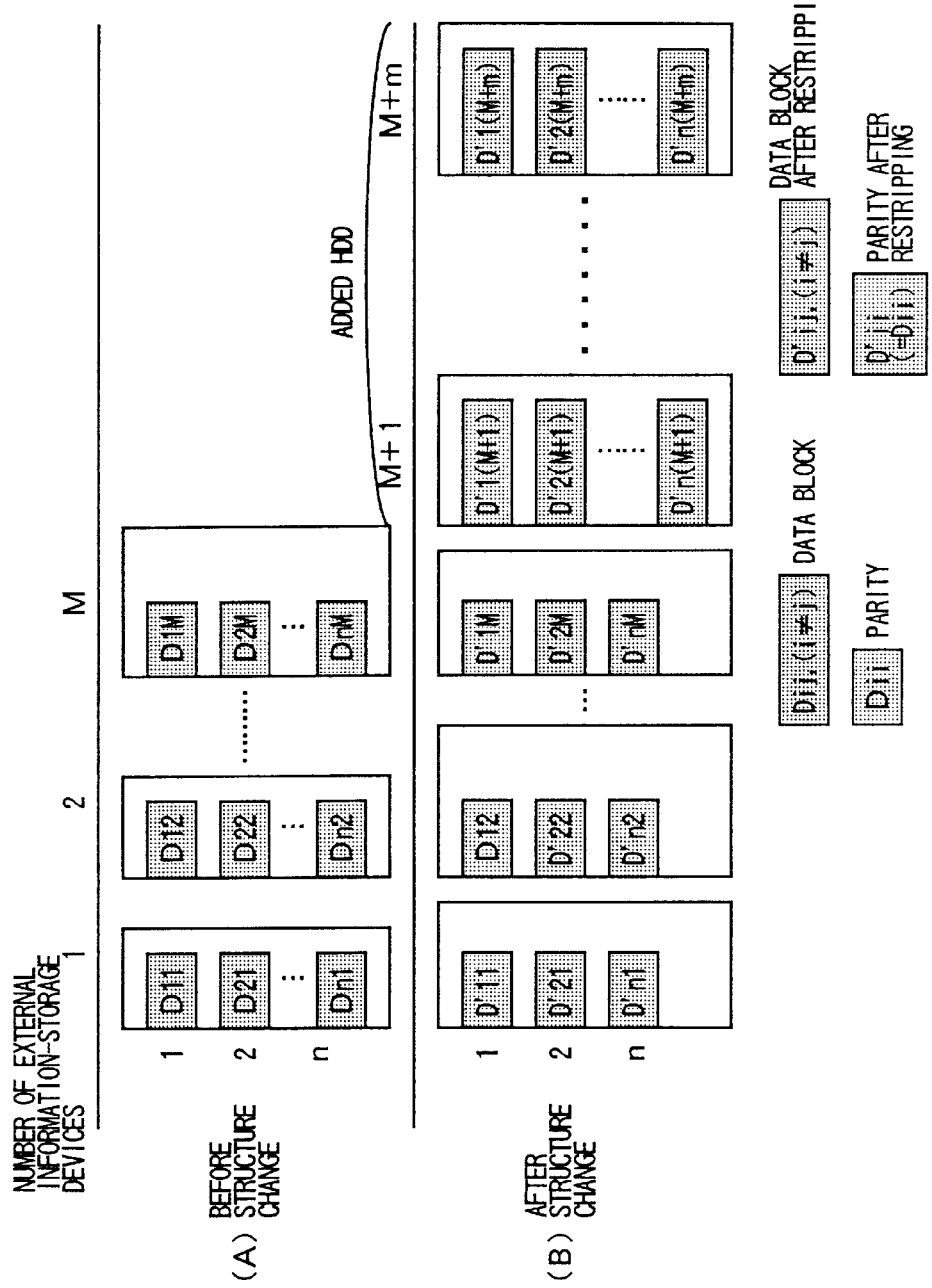
FIG. 31 is an illustration for explaining an operation of the information storage system according to the fifth embodiment of the present invention.

A description will now be given of an operation of the information storage system according to the fifth embodiment of the present embodiment. FIG. 31 is an illustration for explaining the operation of the information storage system according to the fifth embodiment of the present invention. FIG. 31-(A) shows a state of data blocks stored in the external information-storage devices 102-1 to 102-M before the external information-storage devices are added. FIG. 31-(B) shows a state of data blocks stored in the external information-storage devices 102-1 to 102-M+m after the external information-storage devices 102-M+1 to 102-M+m are added.

As shown in FIG. 31-(A), before the change is made, data blocks D11 to D1M, D21 to D2M, . . . , Dn1 to DnM are distributed to the respective M external information-storage devices 102-1 to 102-M. Then, the external information-storage devices 102-M to 102-M+m are added to the system, and the data blocks D11 to D1M, D21 to D2M, . . . , Dn1 to DnM are divided into D'11 to D'1(M+m), D'21 to D'2(M+m), . . . , D'n1 to D'n(M+m), respectively, as shown in FIG. 31-(B), by performing the process shown in FIG. 30.

Figure 32:
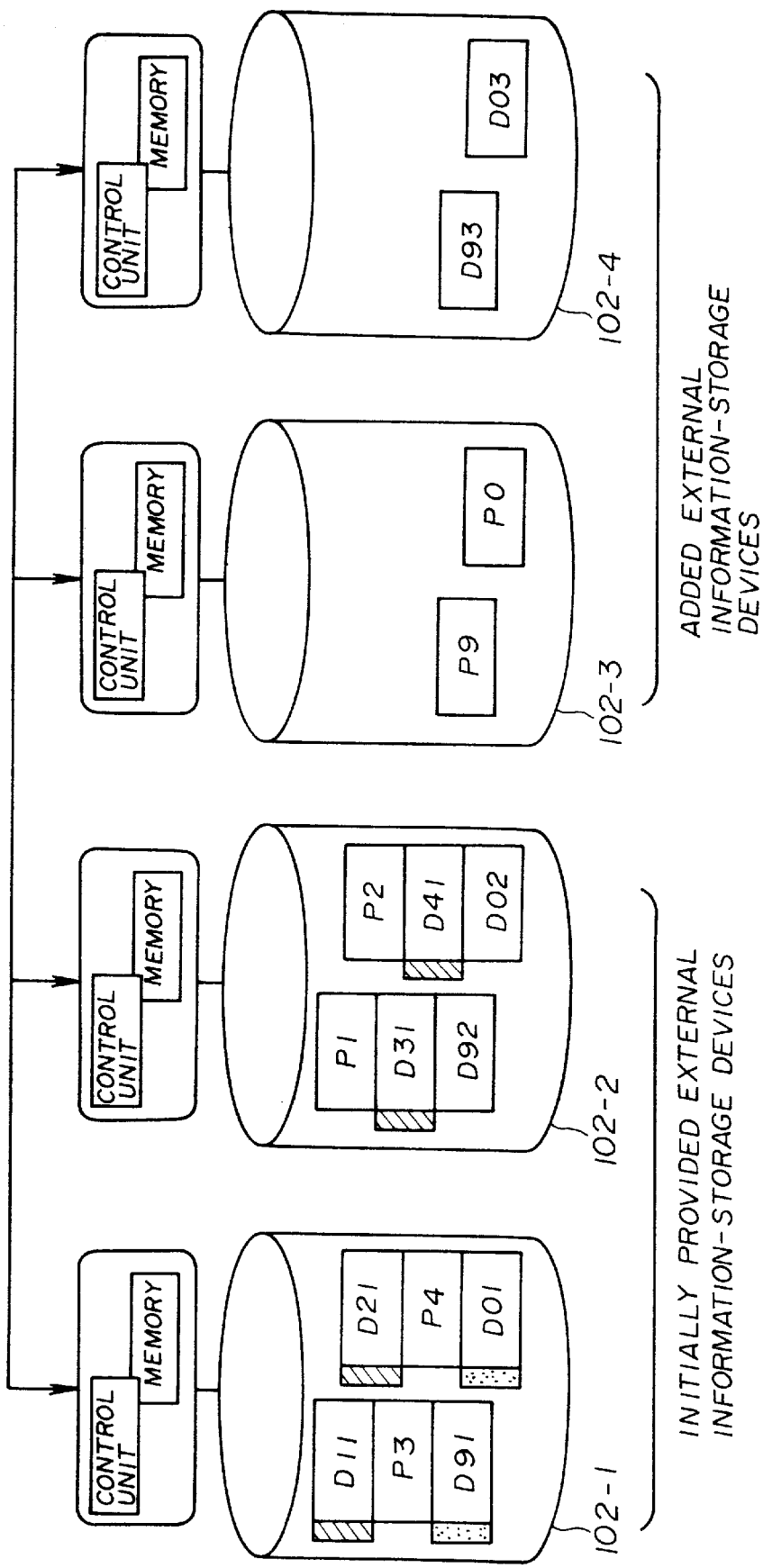
FIG. 32 is an illustration for explaining a state of data blocks stored in the external information-storage devices provided in the information storage devices according to the fifth embodiment of the present invention after the external information-storage devices are added and before stripping is performed.

FIG. 32 is an illustration for explaining a state of data blocks stored in the external information-storage devices provided in the information storage devices according to the fifth embodiment of the present invention after the external information-storage devices are added and before stripping is performed. In FIG. 32, the external information-storage devices 102-3 and 102-4 are added to the system provided with the external information-storage devices 102-1 and 102-2.

In FIG. 32, data blocks D11, D21, D31 and D41 and their parities P1, P2, P3 and P4 are stored in the initially provided external information-storage devices 102-1 and 102-2. Data blocks D91, D92, D93, D01, D02 and D03, which are input after the external information-storage devices 102-3 and 104 are added, and parities P9 and P0 are evenly distributed to the four external information-storage devices 102-1 to 102-4.

FIG. 33 is an illustration for explaining contents of the division information before restripping and after the external information-storage devices are added.

As shown in FIG. 33, the division information before restripping is set so that the data block D11 is stored at the logical block address "LBA-D11" of the external information-storage device 102-1 (HDD1) over three blocks with the number of divisions being set to "1". Additionally, the parity division information is set so that the parity P1 of the data block D11 is stored at a logical block address "LBA-D11-P" assigned to the external information-storage device 102-2 (HDD2) by three blocks corresponding to 1,536 bytes.

In the present embodiment, the data block D11 is divided into three data blocks, which are evenly distributed to the four external information-storage devices 102-1 to 102-4 together with the parity P1.

Figure 34:
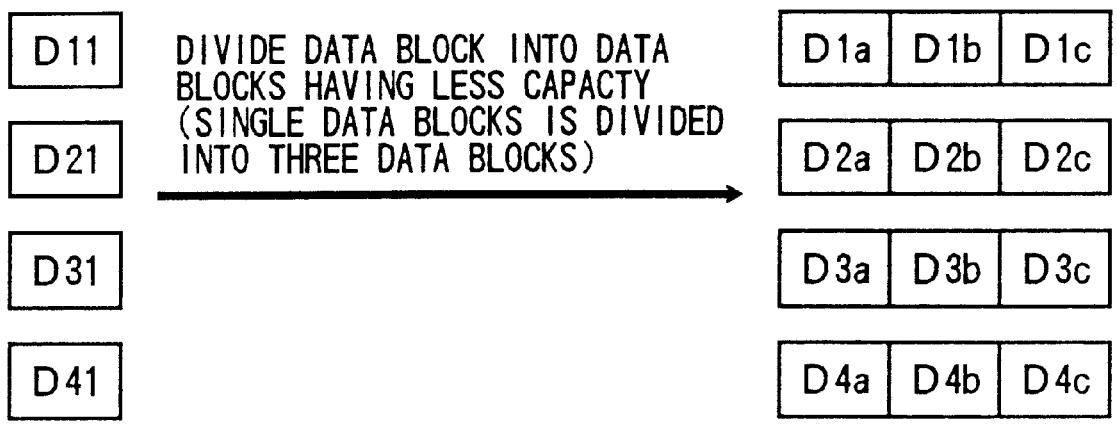
FIG. 34 is an illustration for explaining division of the data block according to the fifth embodiment of the present invention.

FIG. 34 is an illustration for explaining the division of the data block according to the fifth embodiment of the present invention. Each of the existing data blocks D11, D21, D31 and D41 is divided into three data blocks D1a, D1b and D1c, D2a, D2b and D2c, D3a, D3b and D3c and D4a, D4b and D4c by the process shown in FIG. 30. The thus-obtained data blocks D1a, D1b, D1c, D2a, D2b, D2c, D3a, D3b, D3c, D4a, D4b and D4c are evenly distributed to the four external information-storage devices 102-1 to 102-4.

Figure 35:
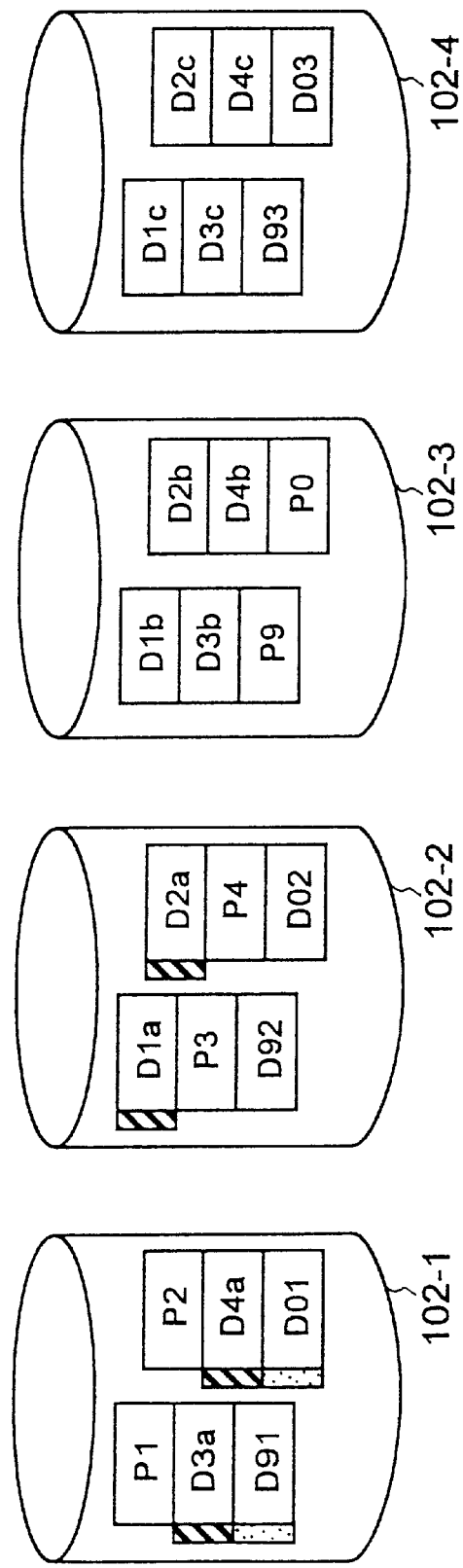
FIG. 35 is an illustration for explaining a state of data blocks stored in the external information-storage devices provided in the information storage devices according to the fifth embodiment of the present invention after the redistribution or restripping has been done.

FIG. 35 is an illustration for explaining a state of data blocks stored in the external information-storage devices provided in the information storage devices according to the fifth embodiment of the present invention after the redistribution or restripping has been done. After the redistribution or restripping is performed in accordance with the process shown in FIG. 30, the data blocks D3a and D4a and the parities P1 and P2 are stored in the external information-storage device 102-1: the data blocks D1a and D2a and the parities P3 and P4 are stored in the external information-storage device 102-2; the data blocks D1b, D2b, D3b and D4b are stored in the external information-storage device 102-3; and the data blocks D1c, D2c, D3c and D4c are stored in the external information-storage device 102-4.

FIG. 36 is an illustration for explaining contents of the division information when the redistribution or restripping is performed.

According to the division information when restripping is performed, the data block D11 is divided into three parts as indicated by the number of divisions being set to "3" so that a first one-third of the data block D1a corresponding to one block is stored at a logical block address "LBA-D1a" assigned to the external information-storage device 102-2 (HDD2); a second one-third of the data block D1b corresponding to one block is stored at a logical block address "LBA-D1b" assigned to the external information-storage device 102-3 (HDD3); and a third one-third of the data block D1c corresponding to one block is stored at a logical block address "LBA-D1c" assigned to the external information-storage device 102-4 (HDD4). Additionally, the parity P1 of the data block D11 is stored at the logical block address "LBA-D1a-D1b-D1c-P" assigned to the external information-storage device 102-1 (HDD1) by three blocks corresponding to 1,536 bytes.

As mentioned above, according to the present embodiment, each of the data blocks stored in the initially provided external information-storage devices is divided into blocks having a smaller capacity in accordance with the number of external information-storage devices after being increased, and the divided blocks are redistributed to all of the external information-storage devices after being increased. Accordingly, there is no need to change a unit of data blocks, and there is no need to change the parity.

It should be noted that although the number of external information-storage devices is increased in the present embodiment, the present invention may be applied when the number of external information-storage devices is decreased.

Figure 37:
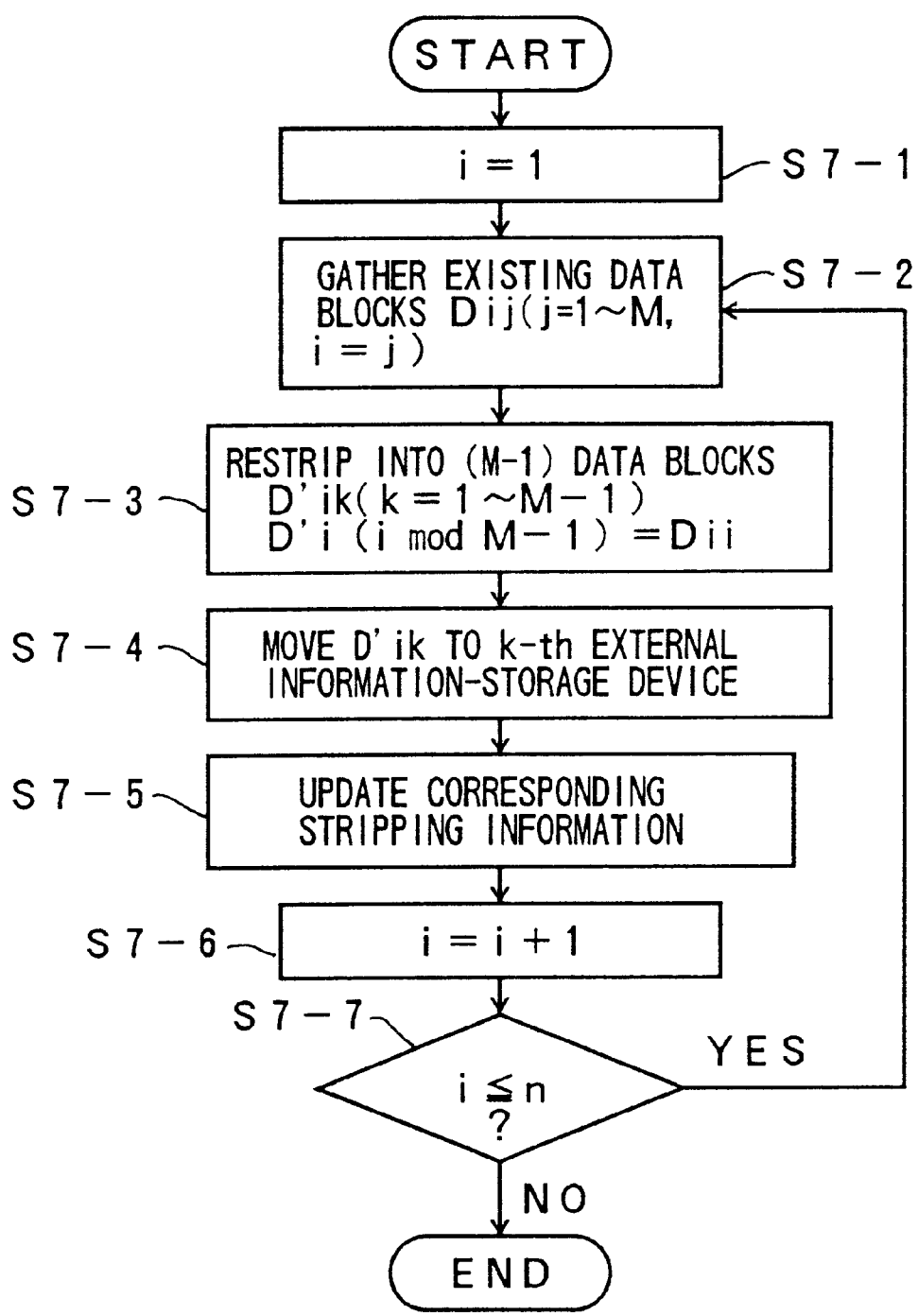
FIG. 37 is a flowchart of a process performed by a control unit provided in an information storage system according to a sixth embodiment of the present invention.

A description will now be given, with reference to FIG. 37, of a sixth embodiment of the present invention. FIG. 37 is a flowchart of a process performed by a control unit provided in an information storage system according to the sixth embodiment of the present invention. A structure of the information storage system according to the sixth embodiment is the same as that of the first embodiment shown in FIG. 8, and a description thereof will be omitted.

In this embodiment, it is assumed that M external information-storage devices 102-1 to 102-M are currently provided in the system, and the data blocks and parities are evenly distributed to the M external information-storage devices 102-1 to 102-M. In this state, when one of the M external information-storage devices 102-1 to 102-M is removed from the system, a variable i is set to i=1 in step S7-1. Thereafter, the existing data blocks Dij(j=1 to M, i≠j) are gathered in step S7-2. At this time, the parity of the data block Dij is represented as Dii. In step S7-3, the existing data blocks Dij gathered in step S7-2 are restripped into (M−1) data blocks. The thus-obtained data blocks are represented by D'ik (k=1 to M−1), and their parities are represented by D'i(imod(M−1)). Then, in step S7-4, the data blocks D'ik obtained in step S7-3 are moved to the k-th external information-storage device 102-k. In step S7-5, the corresponding stripping information is updated. In step S7-6, the variable i is incremented by 1 (i=i+1). It is then determined, in step S7-7, whether or not the variable i is equal to or smaller than the number n of the data blocks. If the variable i is equal to or smaller than the number n of the data blocks, the routine returns to step S7-2 so as to repeat the process of steps S7-2 to S7-7. If the variable i is greater than the number n of the data blocks, the routine is ended.

Figure 38:
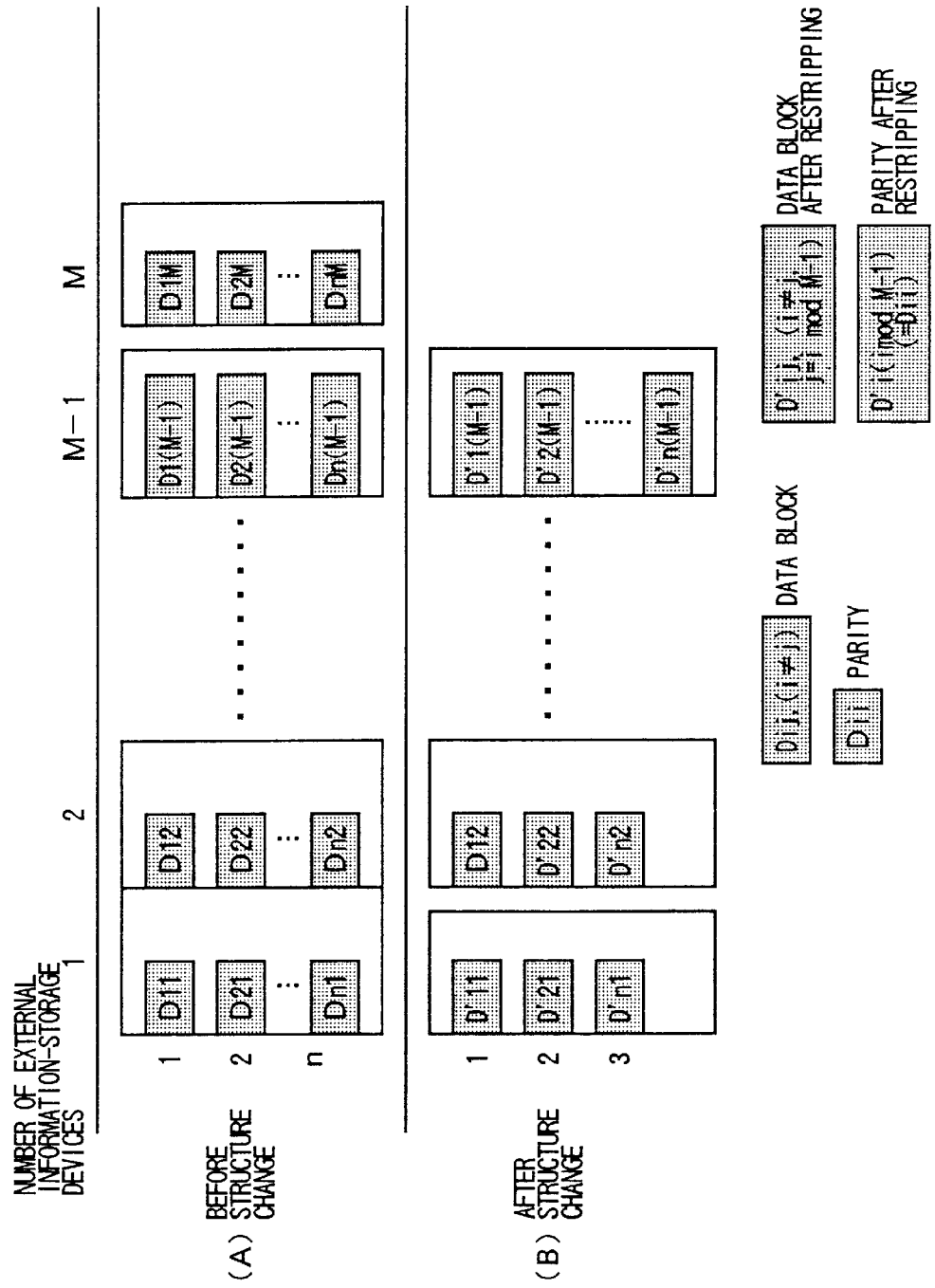
FIG. 38 is an illustration for explaining an operation of the information storage system according to the sixth embodiment of the present invention.

A description will now be given of an operation of the information storage system according to the sixth embodiment of the present invention. FIG. 38 is an illustration for explaining the operation of the information storage system according to the sixth embodiment of the present invention. FIG. 38-(A) shows a state of data blocks stored in the external information-storage devices 102-1 to 102-M before one of the external information-storage devices is removed. FIG. 38-(B) shows a state of data blocks stored in the external information-storage devices 102-1 to 102-(M−1) after one of the external information-storage devices 102-1 to 102-M is removed.

As shown in FIG. 38-(A), before the change is made, data blocks D11 to D1M, D21 to D2M, . . . , Dn1 to DnM are distributed to the respective M external information-storage devices 102-1 to 102-M. Then, one of the external information-storage devices 102-1 to 102-M is removed from the system, and the data blocks D11 to D1M, D21 to D2M, . . . , Dn1 to DnM are divided into D'11 to D'1(M−1), D'21 to D'2(M−1), . . . , D'n1 to D'n(M−1), respectively, as shown in FIG. 38-(B) by performing the process shown in FIG. 37.

Figure 39:
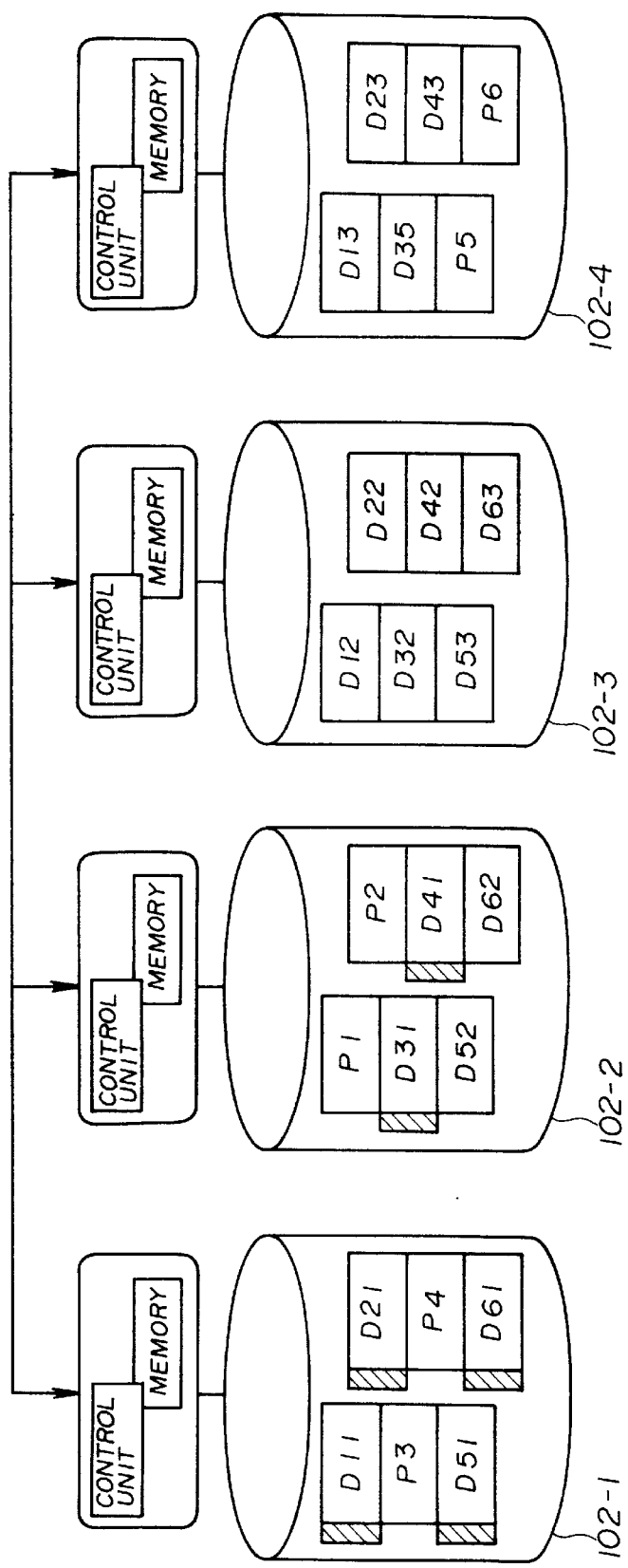
FIG. 39 is an illustration for explaining a state of data blocks stored in the external information-storage devices provided in the information storage devices according to the sixth embodiment of the present invention before one of the external information-storage devices is removed.

FIG. 39 is an illustration for explaining a state of data blocks stored in the external information-storage devices provided in the information storage devices according to the sixth embodiment of the present invention before one of the external information-storage devices is removed. In FIG. 39, data blocks D11 to D13, D21 to D23, D31 to D33, D41 to D43, D51 to D53 and D61 to D63 and their parities P1 to P6 are evenly distributed to and stored in the initially provided external information-storage devices 102-1 to 102-4.

FIG. 40 is an illustration for explaining contents of the division information before one of the external information-storage devices is removed. As shown in FIG. 40, the division information before change includes the number of divisions being set to "3" so that the data blocks D11 to D13 are stored in three external information-storage devices. That is, the data block D11 is stored at the logical block address "LBA-D11" of the external information-storage device 102-1 (HDD1) over two blocks; the data block D12 is stored at the logical block address "LBA-D12" of the external information-storage device 102-2 (HDD2) over two blocks; and the data block D13 is stored at the logical block address "LBA-D13" of the external information-storage device 102-4 (HDD4) over two blocks. Additionally, the parity division information is set so that the parity P1 of the data blocks D11 to D13 is stored at a logical block address "LBA-D11-D12-D13-P" assigned to the external information-storage device 102-2 (HDD2) by two blocks corresponding to 1,024 bytes.

In the present embodiment, the data blocks D11 to D13 are gathered and divided into two data blocks, and the divided two data blocks are evenly distributed to the three external information-storage devices 102-1 to 102-3 together with the parity P1.

Figure 41:
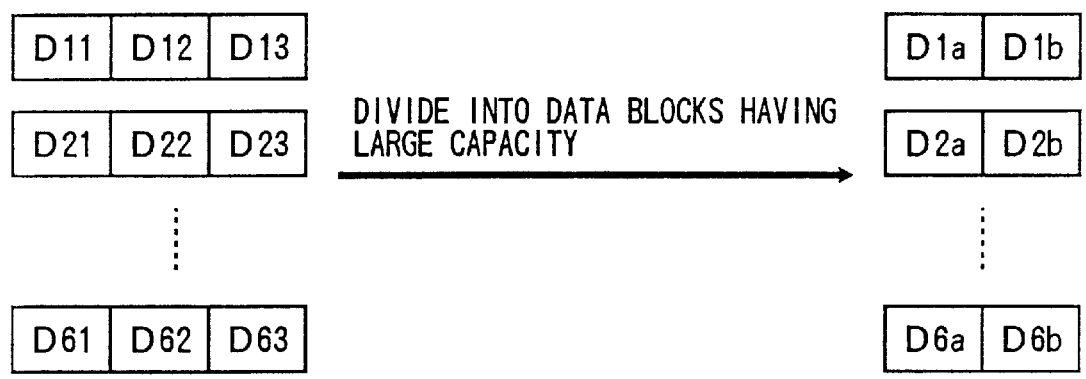
FIG. 41 is an illustration for explaining the division of the data block according to the sixth embodiment of the present invention.

FIG. 41 is an illustration for explaining the division of the data block according to the sixth embodiment of the present invention. The existing data blocks D11 to D13, D21 to D23, D31 to D33, D41 to D43, D51 to D53 and D61 to D63 are once gathered and divided into two data blocks D1*a* and D1*b*, D2*a* and D2*b*, D3*a* and D3*b*, D4*a* and D4*b*, D5*a* and D5*b* and D6*a* and D6*b*, respectively, by performing the process shown in FIG. 37. The thus-obtained data blocks D1*a*, D1*b*, D2*a*, D2*b*, D3*a*, D3*b*, D4*a*, D4*b*, D5*a*, D5*b*, D6*a* and D6*b* and their parities P1 to P6 are evenly distributed to the three external information-storage devices 102-1 to 102-3.

Figure 42:
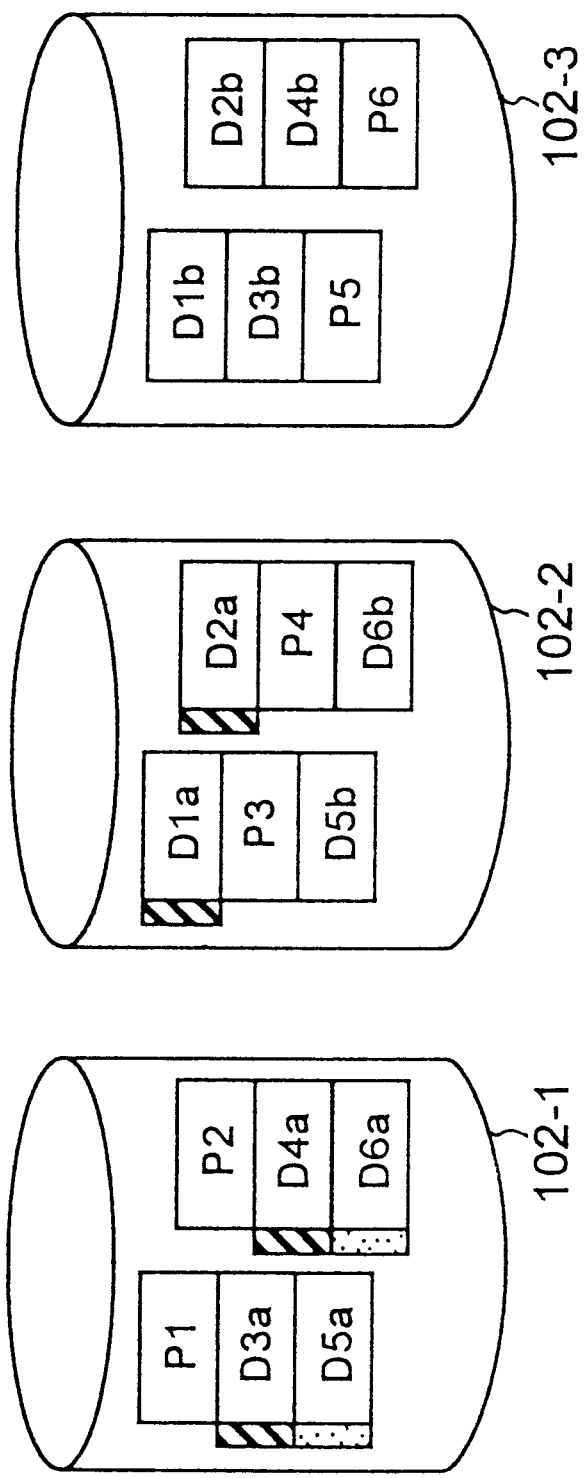
FIG. 42 is an illustration for explaining a state of data blocks stored in the external information-storage devices provided in the information storage devices according to the sixth embodiment of the present invention after the redistribution or restripping has been done.

FIG. 42 is an illustration for explaining a state of data blocks stored in the external information-storage devices provided in the information storage devices according to the sixth embodiment of the present invention after the redistribution or restripping has been done. After the redistribution or restripping is performed in accordance with the process shown in FIG. 37, the data blocks D3*a*, D4*a*, D5*a* and D6*a* and the parities P1 and P2 are stored in the external information-storage device 102-1; the data blocks D1*a*, D2*a*, D5*b* and D6*b* and the parities P3 and P4 are stored in the external information-storage device 102-2; and the data blocks D1*b*, D2*b*, D3*b* and D4*b* and the parities P5 and P6 are stored in the external information-storage device 102-3.

FIG. 43 is an illustration for explaining contents of the division information when the redistribution or restripping is performed.

According to the division information when restripping is performed, the data blocks D11 to D13 are gathered and divided into two parts as indicated by the number of divisions being set to "2". That is, the data block D1*a* corresponding to three blocks is stored at a logical block address "LBA-D1*a*" assigned to the external information-storage device 102-2 (HDD2), and. the data block D1*b* corresponding to three blocks is stored at a logical block address "LBA-D1*b*" assigned to the external information-storage device 102-3 (HDD3). Additionally, the parity P1 of the data blocks D1*a* and D1*b* is stored at the logical block address "LBA-D1*a*-D1*b*-D1*c*-P" assigned to the external information-storage device 102-1 (HDD1) by two blocks corresponding to 1,024 bytes.

As mentioned above, according to the present embodiment, the data blocks stored in the initially provided external information-storage devices are gathered and divided into blocks having a larger capacity in accordance with the number of external information-storage devices after being decreased, and the divided blocks are redistributed to the external information-storage devices after being decreased. Accordingly, there is no need to change a unit of data blocks for obtaining a parity. Additionally, there is no need to change existing parities.

It should be noted that although each of the external information-storage devices is an independent device in the present embodiment, a plurality of external information-storage devices may be handled as a single external information-storage device.

Figure 44:
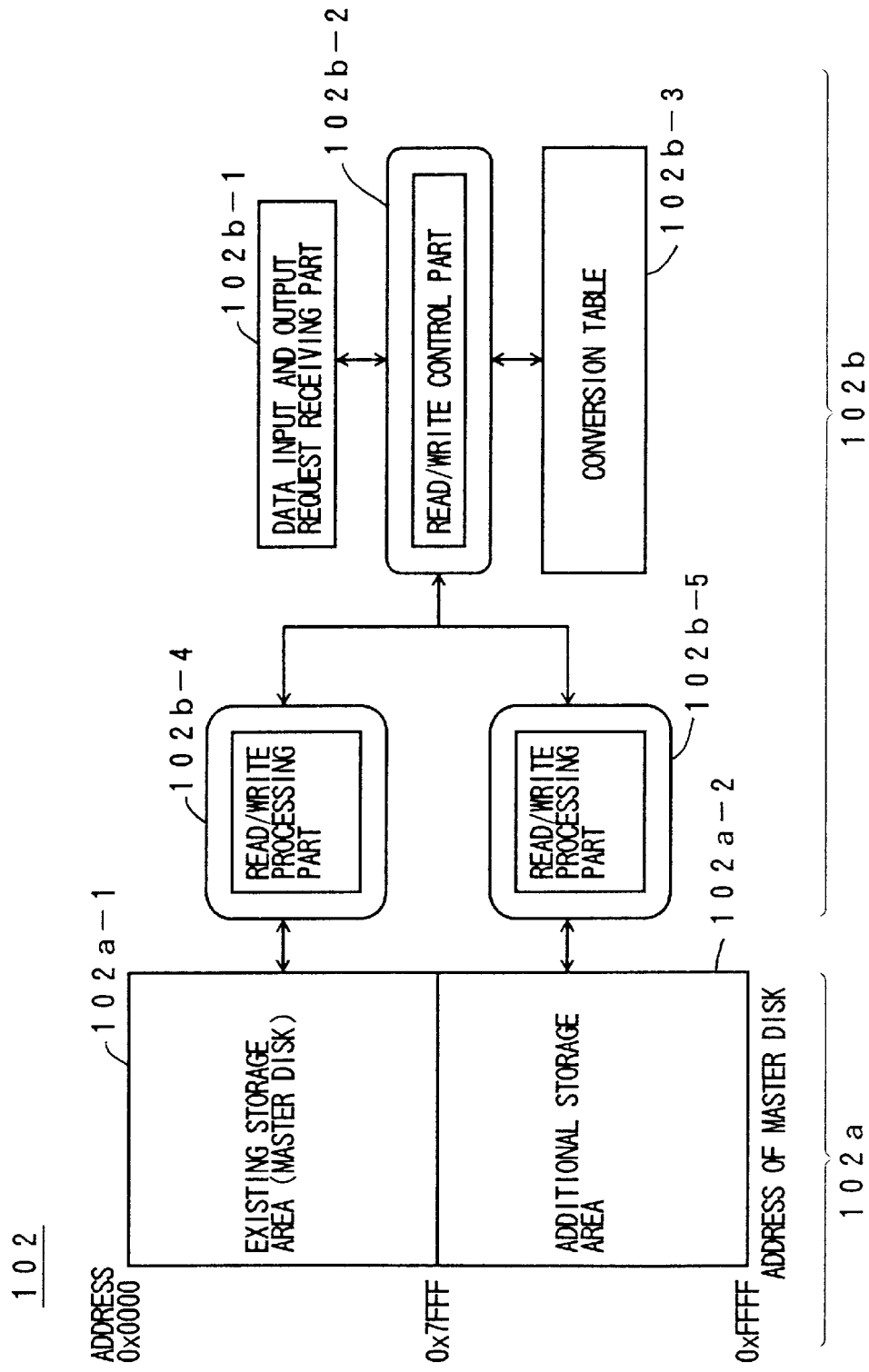
FIG. 44 is a block diagram of an external information-storage device provided in an information storage system according to a seventh embodiment of the present invention.

A description will now be given, with reference to FIG. 44, of a seventh embodiment of the present invention. FIG. 44 is a block diagram of an external information-storage device provided in an information storage system according to the seventh embodiment of the present invention. An entire structure of the information storage system according to the seventh embodiment is the same as that of the first embodiment shown in FIG. 8, and a description thereof will be omitted.

The external information-storage device 102 according to the seventh embodiment of the present invention comprises a storage part 102*a* and a control part 102*b*. The storage part 102*a* comprises an existing storage area 102*a*-1 and an additional storage area 102*a*-2. A series of addresses are assigned to the existing storage area 102*a*-1 and the additional storage area 102*a*-2. That is, as shown in FIG. 44, addresses (represented by hexadecimal numerals) from "0x0000" to "0x7FFE" are assigned to the existing storage area 102*a*-1, and addresses "0x7FFF" to "0xFFFF" are assigned to the additional storage area 102*a*-2.

The control part 102*b* handles the existing storage area 102*a*-1 and the additional storage area 102*a*-2 as a single storage area so as to increase a capacity of the storage area. The control part 102*b* comprises a data input and output request receiving part 102*b*-1, a read/write control part 102*b*-2, a conversion table 102*b*-3 and read/write processing parts 102*b*-4 and 102*b*-5.

The data input and output request receiving part 102*b*-1 receives a request for inputting and outputting data from the control unit 103. The request received by the receiving part 102*b*-1 is supplied to the read/write control part 102*b*-2. The read/write control part 102*b*-2 controls the read/write processing parts 102*b*-4 and 102*b*-5 by referring to the conversion table 102*b*-3 in accordance with addresses designated by the request received from the data input and output request receiving part 102*b*-1.

The read/write control unit 102*b*-2 sends the request to the conversion table 102*b*-3 so as to convert information included in the request into an address of the storage areas 102*a*-1 and 102*a*-2. When the address obtained by conversion corresponds to the address assigned to the existing storage area 102*a*-1, the read/write control part 102*b* controls the read/write processing part 102*b*-4 so as to read data stored at the converted address in the existing storage area 102*a*-1. When the address obtained by conversion corresponds to the address assigned to the additional storage area 102*a*-2, the read/write control part 102*b* controls the read/write processing part 102*b*-5 so as to read data stored at the converted address in the additional storage area 102*a*-2.

Figure 45:
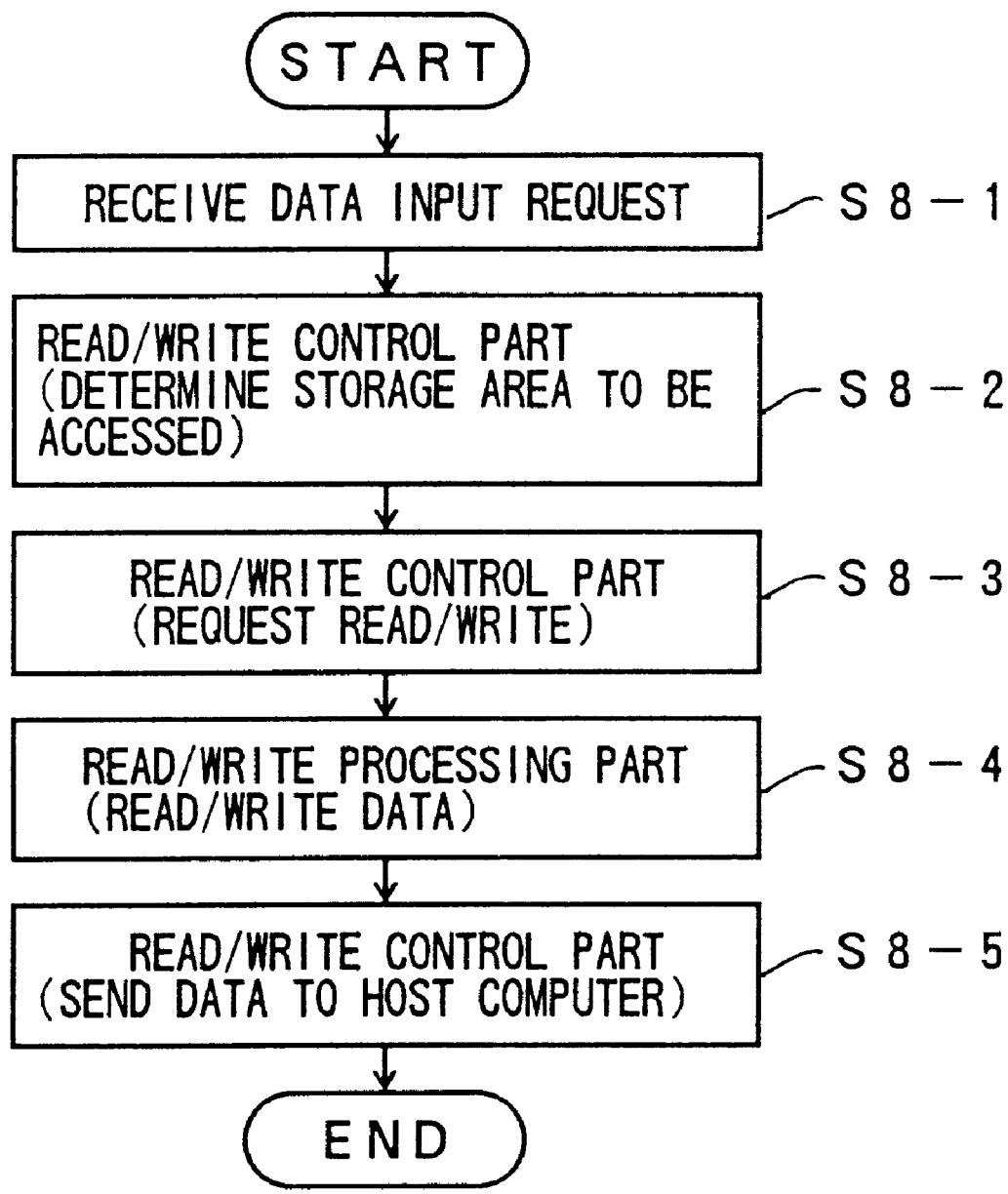
FIG. 45 is a flowchart of a process performed by a control part of an external information-storage device provided in the information storage system according to the seventh embodiment of the present invention.

FIG. 45 is a flowchart of a process performed by a control part 102b of the external information-storage device 102 provided in the information storage system according to the seventh embodiment of the present invention.

In step S8-1, the data input and output request receiving part 102b-1 of the control part 102b receives a data input request from the control unit 103. The received request is sent to the read/write control part 102b-2. Then, in step S8-2, the read/write control part 102b-2 refers to the conversion table 102b-3 so as to determine which one of the existing storage area 102a-1 and the additional storage area 102a-2 is to be accessed. In step S8-3, the read/write control part 102b-2 requests the read/write processing 102b-4 or 102b-5 to read data from the existing storage area 102a-1 or 102a-2 in accordance with the address obtained by the conversion table 102b-3. Accordingly, in step S8-4, one of the read/write processing parts 102b-4 and 102b-5 accesses the corresponding one of the existing storage part 102a-1 and the additional storage part 102a-2 so as to read data therefrom. Then, in step S8-5, the read/write control part 102b-2 sends the read data to the control unit 103 via the data input and output request receiving part 102b-1, and the routine is ended.

Figure 46:
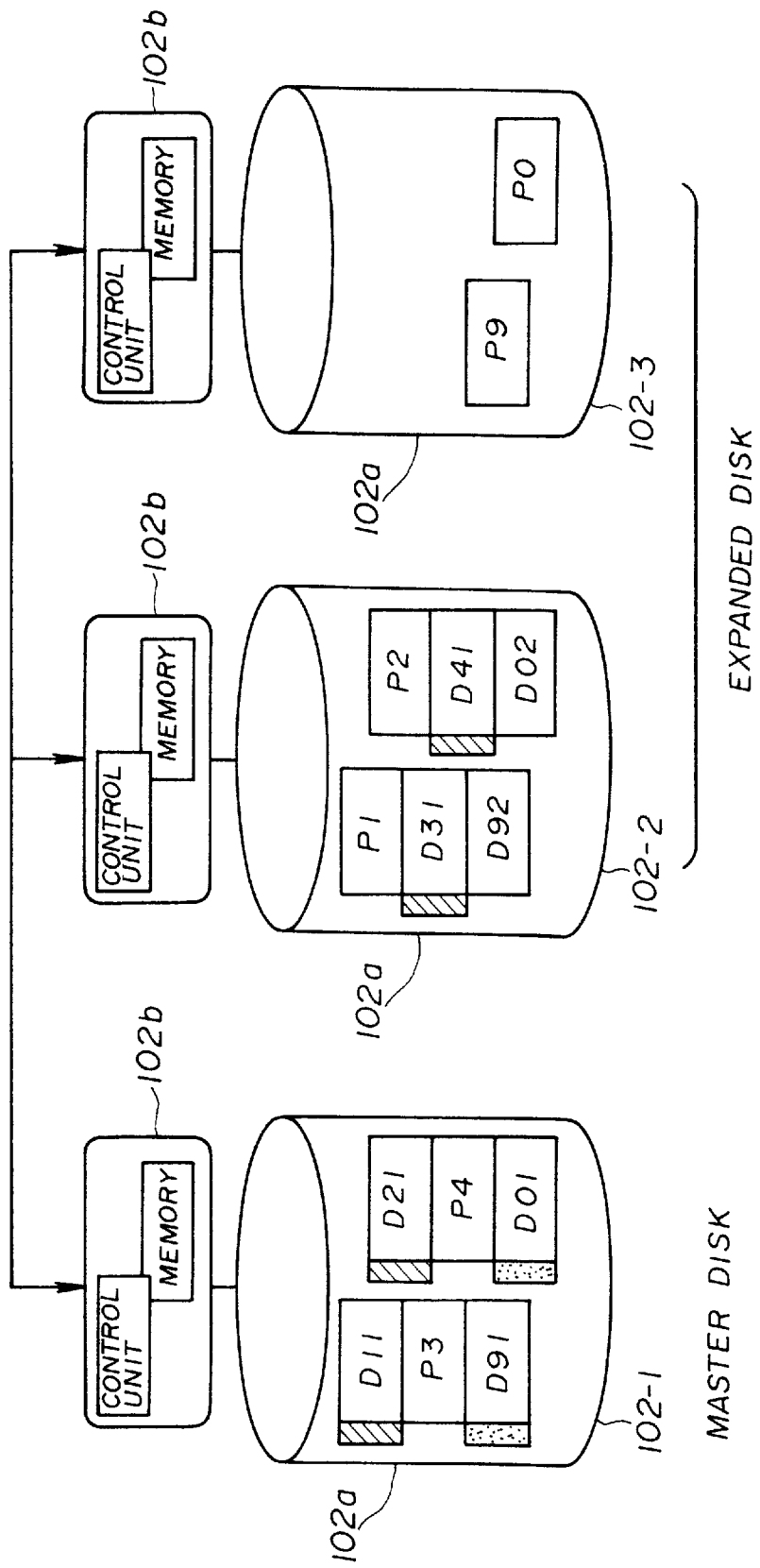
FIG. 46 is an illustration showing a state of data blocks stored in an external information-storage devices before change.
Figure 47:
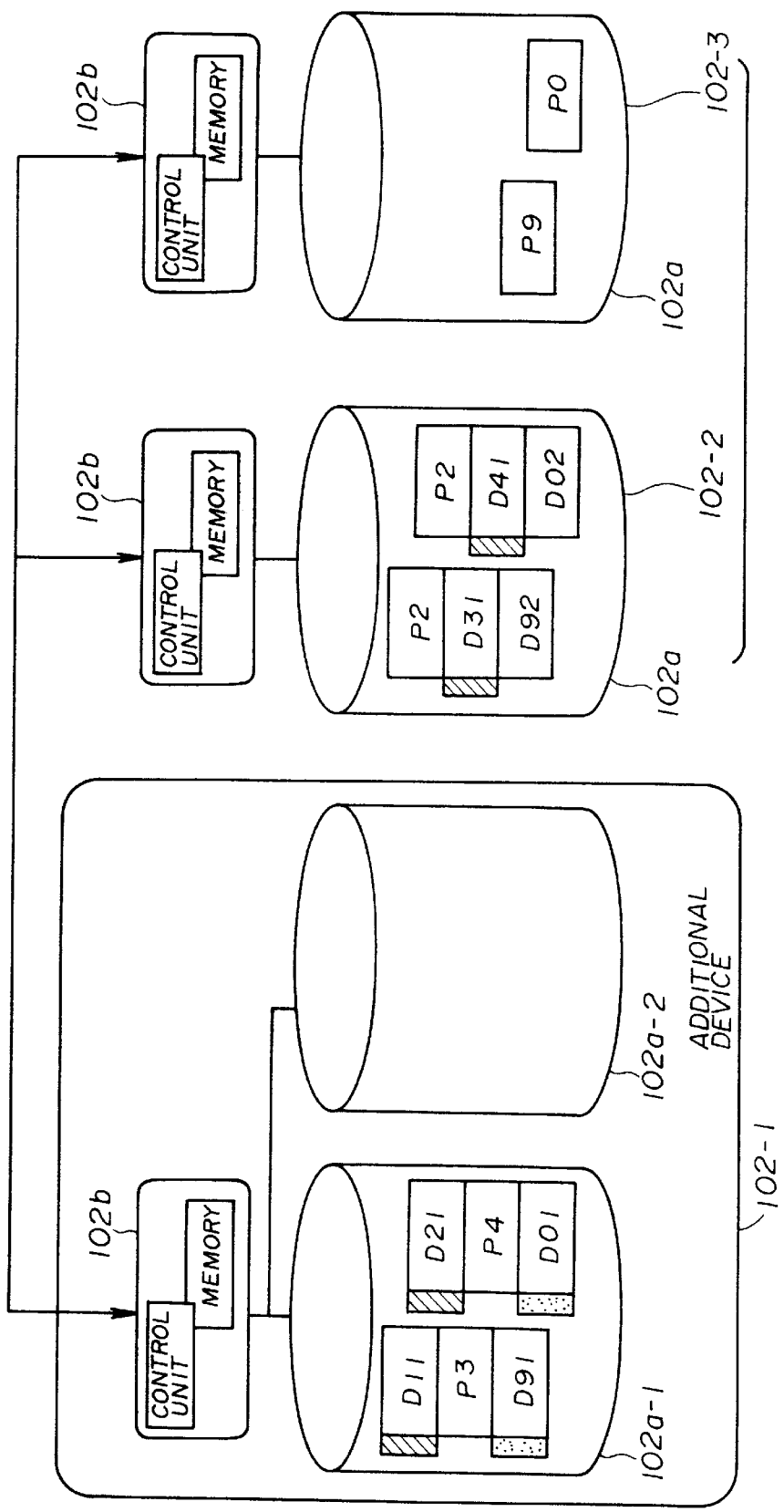
FIG. 47 is an illustration showing a state of data blocks stored in the external information-storage devices after the change.

A description will now be given, with reference to FIGS. 46 and 47, of an operation of the information storage system according to the seventh embodiment of the present invention. FIG. 46 is an illustration showing a state of data blocks stored in the external information-storage devices before change. FIG. 47 is an illustration showing a state of data blocks stored in the external information-storage devices after change.

When data blocks D11, D21, D91 and D01 and their parities P3 and P4 are stored in the external information-storage device 102-1 as shown in FIG. 46, and there is no empty area for storage in the external information-storage device 102-1, an additional information-storage device 102a-2 is connected to the control part 102b of the external information-storage device 102-1 as shown in FIG. 47.

In the conventional RAID system, if the external information-storage device 102-1 is full, additional data cannot be stored in the system even when there is an empty area in other external information-storage devices 102-2 and 102-3. However, according to the present embodiment, since the additional information-storage device 102a-2 is regarded as a part of the external information-storage device 102-1, an empty storage area is provided to the external information-storage apparatus 102-1. Thus, data blocks can be stored in the system continuously by evenly distributing the data blocks to the external information-storage devices 102-1, 102-2 and 102-3.

It should be noted that an additional information-storage device is added to the external information-storage device which has no empty storage area in the above-mentioned embodiment so as to continuously use all of the external information-storage devices provided in the system. However, the RAID system may be reconstructed by using the external information-storage devices that have empty storage area.

The present invention is not limited to the specifically disclosed embodiments, and variations and modifications may be made without departing from the scope of the present invention.

The present application is based on Japanese priority applications No.10-145784 filed on May 27, 1998 and No.10-260601 filed on Sep. 14, 1998, the entire contents of which are hereby incorporated by reference.

What is claimed is:

1. An information storage system for storing information, comprising:

a plurality of information storage devices;

a division processing unit dividing the information to be stored in the information storage devices and distributing the divided information to said information storage devices; and a division control unit controlling said division processing unit so as to divide the information in accordance with a number of said information storage devices, wherein, when the number of said information storage devices is increased or decreased, said division control unit controls said division processing unit so that the information stored in said information storage devices is automatically divided by a dividing method suitable for the number of said information storage devices after being increased or decreased, and the divided information is automatically redistributed to the number of said information storage devices after being increased or decreased;

wherein said division control unit controls said division processing unit so that, when the number of said information storage devices is increased or decreased, the information previously stored in said information storage devices that is read from said information storage devices is divided in accordance with the dividing method suitable for the increased or decreased number of said information storage devices and redistributed to the number of said information storage devices after being increased or decreased when the previously stored information is read from said information storage devices.

2. The information storage system as claimed in claim 1, wherein said division control unit controls said division processing unit so that, when the number of said information storage devices is increased, information to be stored after the number of said information storage devices is increased is divided in accordance with a dividing method suitable for the increased number of said information storage devices.

3. The information storage system as claimed in claim 1, wherein said division control unit controls said division processing unit so that, when the number of said information storage devices is decreased, the information previously stored in said information storage devices is divided in accordance with a dividing method suitable for the decreased number of said information storage devices.

4. The information storage system as claimed in claim 1, wherein said division control unit includes a division information managing unit managing division information indicating the dividing method.

5. The information storage system as claimed in claim 4, wherein the division information includes information regarding a number of divisions of the information, an address at which each divided information is stored and an amount of each divided information.

6. The information storage system as claimed in claim 4, wherein said division control unit includes a division information storing memory storing the division information when the information is stored in said information storage devices.

7. The information storage system as claimed in claim 1, wherein said division control unit includes an error correcting unit providing error correction information to the information to be stored in said information storage devices, said error correcting unit correcting the information in accordance with the error correction information when the information is read from said information storage devices.

8. The information storage system as claimed in claim 1, wherein said division control unit obtains information to be stored in said information storage devices after the number of said information storage devices is changed by changing a unit of division while maintaining a unit of processing for the entire information to be stored.

9. The information storage system as claimed in claim 1, wherein at least one of said information storage devices includes a control part controlling a plurality of information storage devices as a single information storage device.

10. A processor readable medium storing program code for causing a computer to store information in a plurality of information storage devices, comprising:

first program code means for dividing the information to be stored in the information storage devices and distributing the divided information to said information storage devices; and second program code means for controlling a dividing operation according to said first program code means so as to divide the information in accordance with a number of said information storage devices so that, when the number of said information storage devices is increased or decreased, the divided information stored in said information storage devices is automatically divided by a dividing method suitable for the number of said information storage devices after being increased or decreased, and the information is automatically redistributed to the number of said information storage devices after being increased or decreased;

wherein said second program code means controls the dividing operation so that, when the number of said information storage devices is increased or decreased, the information previously stored in said information storage devices that is read from said information storage devices is divided in accordance with the dividing method suitable for the increased or decreased number of said information storage devices and redistributed to the number of said information storage devices after being increased or decreased when the previously stored information is read from said information storage devices.

11. The processor readable medium as claimed in claim 10, wherein said second program code means controls the dividing operation so that, when the number of said information storage devices is increased, information to be stored after the number of said information storage devices is increased is divided in accordance with a dividing method suitable for the increased number of said information storage devices.

12. The processor readable medium as claimed in claim 10, wherein said second program code means controls the dividing operation so that, when the number of said information storage devices is decreased, the information previously stored in said information storage devices is divided in accordance with a dividing method suitable for the decreased number of said information storage devices.

13. The processor readable medium as claimed in claim 10, wherein said second program code means includes third program code means for managing division information indicating the dividing method.

14. The processor readable medium as claimed in claim 13, wherein the third program code means manages the division information including information regarding a number of divisions of the information, an address at which each divided information is stored and an amount of each divided information.

15. The processor readable medium as claimed in claim 13, further comprising fourth program code means for storing the division information when the information is stored in said information storage devices.

16. The processor readable medium as claimed in claim 10, further comprising fifth program code means for providing error correction information to the information to be stored in said information storage devices, and for correcting the information in accordance with the error correction information when the information is read from said information storage devices.

17. The processor readable medium as claimed in claim 10, wherein said second program code means includes sixth program code means for obtaining information to be stored in said information storage devices after the number of said information storage devices is changed by changing a unit of division while maintaining a unit of processing for the entire information to be stored.

18. The processor readable medium as claimed in claim 10, further comprising seventh program code means for controlling a plurality of information storage devices as a single information storage device.

* * * * *